(12) United States Patent
Ansari et al.

(10) Patent No.: US 8,422,397 B2
(45) Date of Patent: Apr. 16, 2013

(54) METHOD AND APPARATUS FOR RAPID SESSION ROUTING

(75) Inventors: Amir Ansari, Plano, TX (US); George A. Cowgill, Farmersville, TX (US); Leon E. Nicholls, Plano, TX (US); Jude P. Ramayya, Wylie, TX (US); Ramprakash Masina, Wylie, TX (US); Atousa Raissyan, Potomac, MD (US); Wu Guan, Allen, TX (US)

(73) Assignee: Prodea Systems, Inc., Plano, TX (US)

( * ) Notice: Subject to any disclaimer, the term of this patent is extended or adjusted under 35 U.S.C. 154(b) by 459 days.

(21) Appl. No.: 11/966,844

(22) Filed: Dec. 28, 2007

(65) Prior Publication Data

US 2009/0168787 A1 Jul. 2, 2009

(51) Int. Cl.
*H04L 12/28* (2006.01)

(52) U.S. Cl.
USPC .......................................... 370/254; 370/401

(58) Field of Classification Search .................. None
See application file for complete search history.

(56) References Cited

U.S. PATENT DOCUMENTS

| | | | |
|---|---|---|---|
| 5,673,252 A | 9/1997 | Johnson et al. | |
| 6,301,609 B1 | 10/2001 | Aravamuden et al. | |
| 6,377,571 B1 | 4/2002 | Tai | |
| 6,456,597 B1 * | 9/2002 | Bare | 370/389 |
| 6,487,646 B1 | 11/2002 | Adams et al. | |
| 6,526,581 B1 | 2/2003 | Edson | |
| 6,542,506 B1 | 4/2003 | Lee | |
| 6,681,232 B1 | 1/2004 | Sistanizadeh et al. | |
| 6,735,619 B1 | 5/2004 | Sawada | |
| 6,898,276 B1 | 5/2005 | Millet et al. | |
| 6,928,576 B2 | 8/2005 | Sekiguchi | |
| 6,930,598 B2 | 8/2005 | Weiss | |
| 6,957,275 B1 | 10/2005 | Sekiguchi | |

(Continued)

FOREIGN PATENT DOCUMENTS

| | | |
|---|---|---|
| WO | WO-2008/082441 | 7/2008 |
| WO | WO-2008/083384 | 7/2008 |

(Continued)

OTHER PUBLICATIONS

International Search Report and the Written Opinion of the International Searching Authority issued in International Application No. PCT/US2008/087724 dated Feb. 17, 2009.

(Continued)

*Primary Examiner* — Gregory Sefcheck
*Assistant Examiner* — Joshua Smith
(74) *Attorney, Agent, or Firm* — Luis M. Ortiz; Kermit D. Lopez; Ortiz & Lopez, PLLC

(57) ABSTRACT

A gateway device at a user premises edge of a wide area network implements a method for rapidly routing a media session for an application layer service. The gateway device receivers a request from a first endpoint device to create the media session with a second device. The request includes an application layer identifier for the second device. The method involves accessing a routing table within the gateway device using the application layer identifier and obtaining, from the internal routing table a network layer address for communication with the second device. The gateway device then creates a route for the media session for the application layer service via bi-directional network layer communications through at least one of its interfaces using the network layer address.

19 Claims, 20 Drawing Sheets

U.S. PATENT DOCUMENTS

| | | | |
|---|---|---|---|
| 6,961,335 B1 | 11/2005 | Millet et al. | |
| 6,961,857 B1* | 11/2005 | Floryanzia | 726/14 |
| 6,965,614 B1 | 11/2005 | Osterhout et al. | |
| 7,035,270 B2 | 4/2006 | Moore, Jr. et al. | |
| 7,075,919 B1 | 7/2006 | Wendt et al. | |
| 7,207,048 B2 | 4/2007 | McQuillan et al. | |
| 7,313,120 B2* | 12/2007 | Ekberg et al. | 370/338 |
| 7,761,527 B2* | 7/2010 | Ferreira et al. | 370/260 |
| 7,987,490 B2 | 7/2011 | Ansari et al. | |
| 2002/0023131 A1 | 2/2002 | Wu et al. | |
| 2002/0060994 A1* | 5/2002 | Kovacs et al. | 370/328 |
| 2002/0122410 A1* | 9/2002 | Kulikov et al. | 370/349 |
| 2002/0176404 A1 | 11/2002 | Girard | |
| 2003/0012155 A1* | 1/2003 | Sayeedi | 370/328 |
| 2003/0126207 A1 | 7/2003 | Creamer et al. | |
| 2003/0140103 A1 | 7/2003 | Szeto et al. | |
| 2003/0210770 A1 | 11/2003 | Krejcarek | |
| 2004/0001480 A1 | 1/2004 | Tanigawa et al. | |
| 2004/0114608 A1* | 6/2004 | Rao et al. | 370/396 |
| 2004/0160969 A1* | 8/2004 | Moon et al. | 370/401 |
| 2004/0255326 A1 | 12/2004 | Hicks, III et al. | |
| 2005/0018612 A1 | 1/2005 | Fitzgerald | |
| 2005/0038875 A1 | 2/2005 | Park | |
| 2005/0108091 A1 | 5/2005 | Sotak et al. | |
| 2005/0174950 A1* | 8/2005 | Ayyagari | 370/254 |
| 2005/0180396 A1* | 8/2005 | Lim | 370/352 |
| 2005/0249196 A1 | 11/2005 | Ansari et al. | |
| 2006/0025132 A1 | 2/2006 | Karaoguz et al. | |
| 2006/0029007 A1* | 2/2006 | Ayyagari | 370/310 |
| 2006/0031406 A1 | 2/2006 | Watson et al. | |
| 2006/0067344 A1* | 3/2006 | Sakurai | 370/401 |
| 2006/0104432 A1* | 5/2006 | Evslin | 370/356 |
| 2006/0146784 A1* | 7/2006 | Karpov et al. | 370/351 |
| 2006/0209857 A1 | 9/2006 | Hicks, III | |
| 2006/0227724 A1* | 10/2006 | Thubert et al. | 370/254 |
| 2006/0256759 A1* | 11/2006 | Sayeedi | 370/335 |
| 2006/0259584 A1 | 11/2006 | Watson et al. | |
| 2007/0109976 A1* | 5/2007 | Samanta et al. | 370/255 |
| 2007/0165629 A1* | 7/2007 | Chaturvedi et al. | 370/389 |
| 2007/0171895 A1 | 7/2007 | Oberle et al. | |
| 2007/0286159 A1 | 12/2007 | Preiss et al. | |
| 2007/0297454 A1* | 12/2007 | Brothers | 370/486 |
| 2008/0084888 A1* | 4/2008 | Yadav et al. | 370/395.31 |
| 2008/0123683 A1* | 5/2008 | Cheng et al. | 370/464 |
| 2008/0151778 A1* | 6/2008 | Venkitaraman et al. | 370/254 |
| 2008/0165789 A1 | 7/2008 | Ansari et al. | |
| 2008/0189774 A1 | 8/2008 | Ansari et al. | |
| 2008/0240125 A1* | 10/2008 | Purvis et al. | 370/401 |
| 2009/0034419 A1* | 2/2009 | Flammer et al. | 370/238 |
| 2009/0037382 A1 | 2/2009 | Ansari et al. | |
| 2009/0067441 A1 | 3/2009 | Ansari et al. | |
| 2009/0070229 A1 | 3/2009 | Ansari et al. | |
| 2009/0180422 A1* | 7/2009 | Bohacek et al. | 370/328 |
| 2010/0014444 A1* | 1/2010 | Ghanadan et al. | 370/310 |
| 2010/0071053 A1 | 3/2010 | Ansari et al. | |
| 2010/0202450 A1 | 8/2010 | Ansari et al. | |
| 2010/0205152 A1 | 8/2010 | Ansari et al. | |
| 2010/0205301 A1 | 8/2010 | Ansari et al. | |
| 2010/0217837 A1 | 8/2010 | Ansari et al. | |
| 2010/0231790 A1 | 9/2010 | Ansari et al. | |
| 2010/0235433 A1 | 9/2010 | Ansari et al. | |
| 2010/0241711 A1 | 9/2010 | Ansari et al. | |
| 2010/0241748 A1 | 9/2010 | Ansari et al. | |
| 2011/0182205 A1* | 7/2011 | Gerdes et al. | 370/254 |

FOREIGN PATENT DOCUMENTS

| | | |
|---|---|---|
| WO | WO-2008/083385 | 7/2008 |
| WO | WO-2008/083387 | 7/2008 |
| WO | WO-2008/083391 | 7/2008 |
| WO | WO-2008/085201 | 7/2008 |
| WO | WO-2008/085202 | 7/2008 |
| WO | WO-2008/085203 | 7/2008 |
| WO | WO-2008/085204 | 7/2008 |
| WO | WO-2008/085205 | 7/2008 |
| WO | WO-2008/085206 | 7/2008 |
| WO | WO-2008/085207 | 7/2008 |
| WO | WO-2009/036088 | 3/2009 |
| WO | WO-2009/036185 | 3/2009 |
| WO | WO-2009/086134 | 7/2009 |

OTHER PUBLICATIONS

Intel, "Delivering on the Promise of Triple Play Digital Media", Technology Backgrounder, Consumer Electronics, © 2004, pp. 1-4.
PCT International Searching Authority—European Patent Office, PCT Notification of Transmittal of the International Preliminary Report on Patentability mailed Jul. 8, 2010, International Application No. PCT/US2008/087724, filed Dec. 19, 2008, 7 Pages, 1211 Geneva 20, Switzerland.

* cited by examiner

METHOD AND APPARATUS FOR RAPID SESSION ROUTING

BACKGROUND

1. Field

The present subject matter relates generally to technologies for rapid session routing during the establishment of sessions between endpoint devices via gateway devices that provide application services from user premises for associated endpoint devices.

2. Background

The digital home is now becoming more complex with the myriad of new and emerging digital devices intended to address many user and consumer needs such as communication, entertainment, privacy and security, etc. However, given the complexity of the emerging digital home and digital environments generally, users who are technologically challenged may find it a daunting and intimidating task to manage their home networks and interconnected digital devices. Moreover, new paradigms are emerging oriented to delivering media content to and the consuming of media content at the home. Many of these paradigms rely on communication of application specific data to and/or from the Internet, as opposed to conventional telephone or broadcast video type applications. The protection of received Internet-sourced media content in addition to user-generated media content is additionally an important aspect that may be inadequately addressed by the technologically challenged user. Furthermore, with respect to Internet based data, most of the content delivery solutions are provided to the digital home networks through availability of the "two-foot" interface (i.e., the PC). It is relatively cumbersome to bring this content to the "ten-foot" interface (e.g., the television).

Thus, a need exists for a technique or devices to simplify the overall management of services and applications available to the digital home or even the small enterprise. Such a technique or devices would reduce the complexity of the maintenance, upgrading, and operation of even the more basic needs addressed by emerging digital endpoint devices and networks. Approaches that suggest greater functionality in home-based appliances fail to reduce or address the complexity of managing and provisioning those appliances. For example, while the home gateway server appliance described in U.S. Pat. No. 6,930,598 enables networked electronic devices to communicate with each other without the direct interaction with external networks, and provides a mechanism whereby a member of the household may be informed of certain network related events without having to use their home computer or other client devices, it does not provide a convenient or simplified way of managing the services and applications executed by, or associated with, that device. Thus, an unmet need exists for a device associated with a user premises that has robust functionality but does not require sophisticated or inordinate attention from the user to manage, provision and utilize them.

In practice, a customer typically subscribes to basic transport services from a network "Service Provider" (e.g., ISP—Internet Service Provider, cable provider, fixed wireless providers, ILEC—Incumbent Local Exchange Carrier, or CLEC—Competitive Local Exchange Carrier). For example, a customer may have broadband Internet access, via cable modem, digital subscriber line service or the like. Digital video service may be provided separately. The network service provider manages these basic services, at the logical network layer, typically at layers 1, 2 or 3 of the OSI model. While network services and associated devices may operate minimally at those levels, they operate at those levels only to support operations at OSI layers 1, 2 or 3. Many applications, however, involve higher level service logic for applications that view the network transport as a transparent pipe. The current internet applications delivery and management architecture, and many devices or management systems based on it, require a server with robust processing and storage capability to be located at the network operations center, not in the home. For voice over internet protocol (VoIP) type telephone service, for example, the VoIP service provider operates a session initiation protocol (SIP) server or the like, and each user has only client functionality. The network transport layers are transparent to the IP packets containing the voice and related signaling. The SIP server, however, controls the call set-up, tear-down, billing and the like for the voice call services. With such an architecture, the major capabilities and functionalities connected with providing application services from the server throughout the network reside on the server and supporting elements, all of which are located in the network operations center.

It might be helpful to walk through examples of the configuration for application services delivery to a client of an application within a user premises under the typical, current network configuration. FIG. 19 depicts one possible configuration for a client application to access a particular service that is being hosted or served outside of the user premises based on the typical, and currently employed, network application service configuration. We identify two regimes in the overall architecture, the Service Provider Network regime (WAN side), and the User Premises Network regime (LAN side). The association between the Service Provider Network and the User Premises Network is broken down into three layers; Network Interconnect (NI) Layer, Network Function (NF) Layer, and the Application Services (AS) Layer. These layers do not represent physical communication pathways, but are a logical representation of pathways and elements employed in a network-based communication.

The separation between the managed Service Provider Network (WAN side) and the User Premises Network (LAN side) is depicted as the Network Service Provider Demarcation. The Network Service Provider Demarcation at the Network Interconnect Layer represents the logical and physical separation between the user premises and the broad-band network. In the present representation of the three functional layers, the Network Service Provider Demarcation is extended into the Services and Application Layer to emphasize the functional barrier at that layer between the Service Provider Network and the User Premises Network, in currently configured networks.

The NI Layer depicts how the connectivity between a User Premises Network and the Public/Service Provider Network is established. On the Service Provider Network side, the Wide Area Network services are terminated onto a WAN termination device with the appropriate interface (e.g., a Broadband internet service such as ADSL would terminate on to a managed ADSL Terminal Adapter). The WAN termination layer adapts the WAN interface into a compatible LAN interface (e.g., Ethernet or WiFi). On the User Premises Network side the LAN Termination interfaces are used to connect to the Local Area Network via a variety of interfaces, such as Ethernet, WiFi, MOCA, etc.

The LAN Termination interfaces and the WAN Termination interface could reside on two separate physical devices or they could reside on one physical device. In either case, on the User Premises Network side, packets or data must flow through the NF Layer between the WAN Termination Interface and the LAN Termination Interface. One or both of these interfaces may reside on a "gateway" device. Gateway and like router devices are currently available for various premises that allow several computers to communicate with one another and to share a broadband Internet connection. These devices function as routers by matching local network addresses and the hostnames of the local computers with the actual networking hardware detected. As gateways, these devices translate local network addresses to those used by the Internet for outgoing communications, and do the opposite translation for incoming packets.

The User Premises NF Layer allows for switching of packets between LAN devices and routing or bridging of packets between the LAN and WAN interfaces. It could physically reside on the same device(s) with the LAN Termination or it could exist at an independent device that could interconnect to the LAN Termination interface via a variety of physical interfaces (e.g., Ethernet, MOCA, etc.). The Service Provider NF Layer provides the Wide Area Network access between the WAN Termination device and the AS Layer where all the applications servers are being hosted. The Internet could be used for this connectivity as could a private packet/cell network (e.g., Cellular packet network, or a private ATM or packet backbone).

The AS Layer represents the functional layer that provides access to applications services by application clients. On the User Premises side, the AS Layer provides a Firewall to protect the application client from application level attacks from the open Internet. On the Service Provider side, the AS Layer encompasses application services such as Parental Control, Backup, and Call Processing. These application services exist on a managed Application Service Delivery Platform (ASD) on a secure network server that can be hosted at a facility that has private and or public data connection paths. The ASD may include three functional modules, namely the Application Service Enforcement (ASE) module, the Application Service Logic (ASL) module, and the Application Service Management (ASM) module.

The ASE module is responsible for enforcing the relevant Application Client privileges to the application services. It gets the policies and permissions of each application client from the ASM module (such as provisioning data and subscription data) and enforces those policies against the requested actions by the client application.

The ASL module executes the application services that the Application Clients request. Such services could be Call Processing, Parental Control, Peered Networking, Backup, etc. The ASL module must interact with the ASM module for monitoring purposes and status information such as Call Data Recording and Billing. It must also interact with the ASE module to provide access to the client applications that have passed the policy enforcement procedures.

The ASM module, as described above, provides the necessary data to the ASE and ASL modules for them to carry out their respective functions. It also oversees the overall integration and communication among all the modules and the services that are managed by the ASM. The ASM also manages the overall security and integrity of the ASD.

All ASD modules are in constant communication with each other, preferably through secure connections. The inter-module communication may be managed by the ASM, or may be independent of a central management function. Note that the ASE, ASL and ASM modules are only examples of functions that may be logically bundled; other bundles, and other means of bundling these functions, are possible.

FIG. 20 depicts a logical flow of how a specific Application Client residing at a user premises could interact with an Application Service that is being managed in the typical network configuration. Traditionally, as depicted in this example, an Application Client (e.g., Telephony) that needs to connect to an Application Service (e.g., call processing) must first connect to the Local Are Network termination interface (1). Depending on the specific deployment, a switching function, routing function or bridging function is used to establish the connection path between the application client (2) and the Firewall service (3). The Firewall Service works in conjunction with the router function (4) to permit access to the Wide Area Network interface (5) and maintain a level of security to the Application Client. The firewall service in this example is not aware of either the type of application client or the specific application service that is being targeted. There is no feedback mechanism between the Application Service Delivery Platform and the Firewall function. Once connectivity to the WAN termination interface is established, routing mechanisms are used to establish a connection through the Service Provider Network Function Layer (6) to the Application Service Layer (7). At the Application Service Layer, the client application goes through application validation procedures and privilege and permission checks by the ASE prior to allowing the application client to connect to the desired application service.

In the logical hierarchy, such as shown in FIGS. 19 and 20, a home gateway device may implement the NI layer functions and the user premises side NF layer functions. The firewall functionality may reside in the gateway or in one or more other elements on the premises network. For example, many PCs internally implement firewalls, e.g., in close association with the client programming of the endpoint device. As can be seen by the illustrations in FIG. 20, however, even with a home gateway deployment for a premises network, the application services functionality still requires the support and service logic to reside on a server in the network. That is, for service provisioning, service management and upgrades, remote diagnostics, for a digital endpoint device such as a PC or SIP phone, the home premises still must rely on the application service logic executed by the service providers in their server networks, typically according to proprietary platforms. Moreover, many other core services, e.g., file storage, media content access and delivery, are offloaded to other 3rd-party service providers that provide service logic and support applications at their network server devices.

With the paradigm discussed above relative to FIGS. 19 and 20, it is currently the case that many of the application service providers also find it difficult to provide and support new emerging technologies at the home. That is, service providers are challenged to select a platform that can evolve with their applications. With existing service architectures, the launch of new services compounds complexity to the core network, adding to both capital and operating expenditures.

Thus, as new services come to the fold, often with the requirement of new equipment, e.g., integrated access devices (IADs) for VoIP and set-top boxes for streaming video, the management of the customer premises equipment (both hardware and software) complicates customer support requirements. Managing the home network environment can be an inhibitor to the adoption of new services, both from the user perspective and from the perspective of management by the service providers.

Further, many of these services and network applications require the establishment of a communication session between two endpoints. Typically, one device (i.e., a first endpoint) requests the establishment of a communication session with another device (e.g., a second endpoint or, in general, a second device, which could include another gateway or other network device) through the application gateway. To establish the communication session, the application gateway must look-up address information from an external address information look-up source. The external lookup entails communication of a query through the wide area network to the server providing the address resolution service and receipt of a response with the necessary address data. This external query and response procedure often adds extra time and delay as a look-up operation must be performed. Further, if the first external address information look-up source is not available or the initially queried source does not have the necessary data, then back-up external address information look-up sources must be used, which will further delay the establishment of the communication session. In addition, because endpoint devices are located behind gateways that may change addresses, the external address information look-up sources need to be constantly updated. Hence, a need exists for a new routing technique that reduces or eliminates the need for external address lookup communications.

It may also be desirable to incorporate improved routing in a new paradigm for managed application service delivery, with improved convenience for the user and easier management for the application service provider. In this later regard, it would be desirable to provide a multi-services application gateway device that provides not only a variety of IP-based communication services, but also offers a centralized management capability for application services while decentralizing certain aspects of the operation of the application services. Such a gateway, in turn, would support the desired improved routing technique.

SUMMARY

The described approach allows a gateway device located on a user's premises to have rapid session routing capabilities by pre-loading address data for known session endpoints into a local routing table. This eliminates the need for any lookups to external tables for specific endpoints that are known to be able to terminate certain sessions from the gateway, thereby eliminating post session initiation delays. Technologies discussed herein relates to techniques of methodologies, which may be embodied for example in gateway devices, programming for such devices, and/or to systems incorporating the gateway devices and a service management center.

A technique discussed herein may be embodied in a gateway device located at a premises for serving one or more endpoint devices associated with the gateway device, the gateway device having a first interface for enabling bi-directional network layer communications within the premises with the one or more endpoint devices; and a second interface for enabling bi-directional communications for the one or more endpoint devices via a wide area network and for enabling at least some bi-directional communications for the gateway device with a service management center external to the premises via the wide area network. The gateway device may implement a method for rapidly routing a media session for an application layer service. In this example, the routing method includes receiving, at the gateway device, a request from a first endpoint device to create the media session with a second device, including an application layer identifier for the second device. In response, the gateway device accesses a routing table within the gateway device using the application layer identifier and obtains, from the internal routing table, a network layer address for communication with the second device. This facilitates creation of a route for the media session for the application layer service via bi-directional network layer communications through at least one of the interfaces using the network layer address.

The technology discussed herein may be also be embodied in a gateway device located at a premises for serving one or more endpoint devices associated with the gateway device. The gateway device has a first interface for enabling bi-directional network layer communications within the premises with the one or more endpoint devices; and a second interface for enabling bi-directional communications for the one or more endpoint devices via a wide area network and for enabling at least some bi-directional communications for the gateway device with a service management center external to the premises via the wide area network. The gateway device may implement a method for rapidly routing a media session for an application layer service from the gateway device. In this example, the method includes transmitting a configuration setup request from the gateway device to the service management center; and receiving a routing table in response to the transmission of the configuration setup request; receiving a request from a first endpoint device to create the media session with a second device. A determination is made as to whether a route entry related to the second device exists in the routing table. A route is created for the media session for the application layer service via bi-directional network layer communications through at least one of the interfaces using the route entry upon determining that the route entry exists.

The technology discussed herein may be also be embodied in a gateway device located at a premises for serving one or more endpoint devices associated with the gateway device. The gateway device has a first interface for enabling bi-directional network layer communications within the premises with the one or more endpoint devices; and a second interface for enabling bi-directional communications for the one or more endpoint devices via a wide area network and for enabling at least some bi-directional communications for the gateway device with a service management center external to the premises via the wide area network. The gateway device may implement a method for rapidly routing a media session for an application layer service from the gateway device, which involves transmitting a configuration setup request from the gateway device to the service management center and receiving a routing table in response to the transmission of the configuration setup request. The gateway device also receives a request from a first endpoint device to create the media session with a second device; and, in response, it determines whether a route entry related to the second device exists in the routing table. Upon determining that the route entry related to the second device does not exist, then the method involves contacting a default server to determine a new route to the second device; and, creating a new route entry in the routing table with the new route.

The technology discussed herein may also be embodied in a system having a gateway device located at a premises for serving one or more endpoint devices, and a service management center external to the premises and coupled to communicate with the gateway device through a wide area network. The gateway device includes a first interface for enabling bi-directional network layer communications within the premises with a first endpoint device associated with the gateway device and a second interface for enabling bi-directional communications for the first endpoint device with a second device via the wide area network. In this example, the gateway device also includes a memory storing a routing table for routing a media session from the first endpoint device to the second device. The routing table comprises an application layer identifier and a network layer address for the second device, the gateway device. The service management center communicates the routing table with the gateway device through the wide area network.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The examples described herein may be more readily understood by referring to the accompanying drawings in which.

Like numerals refer to like parts throughout the several views of the drawings.

DETAILED DESCRIPTION OF THE PREFERRED EMBODIMENTS

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various technologies disclosed herein result in improved routing by providing a lookup in a gateway device at the customer premises. The gateway device can be preloaded with address data for known session endpoints in a local routing table. This eliminates the need for any lookups to external tables, such as a domain name service (DNS) lookup, for specific endpoints that are known to be able to terminate certain sessions from the endpoint devices associated with the gateway device, thereby eliminating certain session initiation delays.

Figure 1:
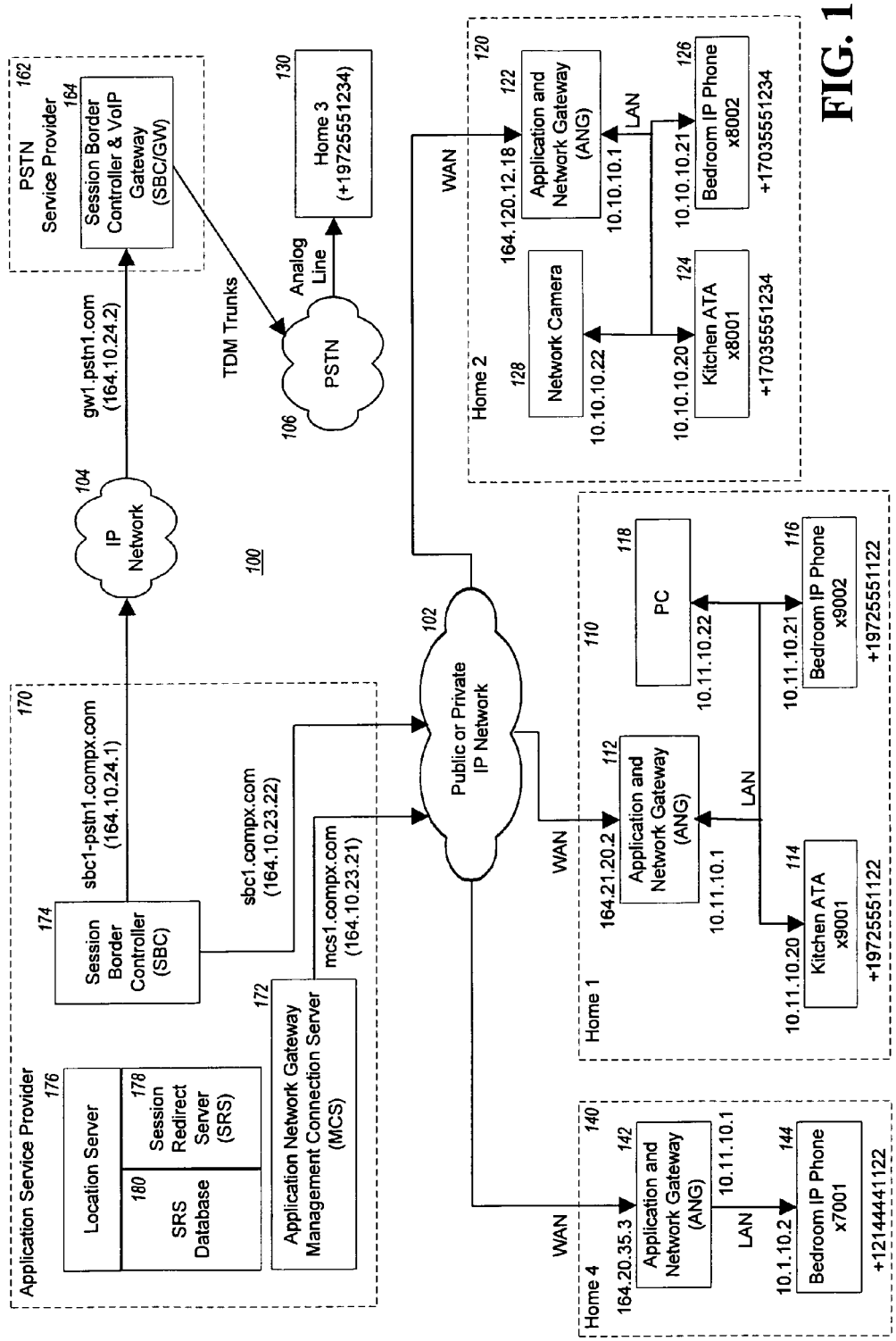
FIG. 1 is a block diagram of an exemplary network containing an application network gateway (ANG).

FIG. 1 is a diagram of a network 100 that will be used as an exemplary network to describe the processes used for rapid multimedia session routing. Network 100 includes an Application Service Provider system (ASP) 170; a plurality of user premises (e.g., a home 110, a home 120, a home 130 and a home 140); and a public switched telephone network (PSTN) service provider 162. Each of the homes 110, 120 and 140 includes an Application Network Gateway (ANG) 112, 122 and 142. The ANGs in the homes 110, 120 and 140 are coupled to the ASP 170 via a public or private Internet Protocol (IP) network 102. In addition, the ASP 170 is coupled to the PSTN service provider 162 through an IP network 104, which may be the same as or different from the network 102. For example, if the homes 110, 120 and 130 communicate with the ASP 170 via the public Internet, the ASP 170 may have a link through a private IP network 104 with the PSTN service provider 162. The PSTN service provider 162 is connected to the home 130 through a PSTN 106 via a PSTN Time Division Multiplexing (TDM) trunk line, with the home 130 coupled to the PSTN 106 using an analog phone line or a basic rate interface type ISDN line, or the like.

ASP 170 also includes a Session Redirect Server (SRS) 178 that has an associated SRS database 180 as well as a Session Border Controller (SBC) 174. The SRS 178 and the associated SRS database 180 have service specific authentication and routing information for the ANGs. The SBC 174 provides access to On-Net calls as well as to Off-Net calls by connecting to a PSTN service provider 162. As used herein, an "On-Net" call is a call between two endpoints on an IP network such as the IP network 102; and an "Off-Net" call is a call from an endpoint on the IP network to an endpoint that is not on the IP network. In the illustrated example, the SBC 174 does not have a direct PSTN connection but includes a packet interface to communicate with the PSTN service provider 162 through telephone service gateway, such as a SBC/Voice over IP (VoIP) gateway 164. In general, the SBC 174 acts as a termination device that couples the wide area network 102 with a diverse network, which includes the IP network 104 and PSTN 106.

As noted, each of the homes 110, 120 and 140 includes a respective ANG 112, 122 and 142. An ANG Management Connection Server (MCS) 172 in the ASP 170 is coupled to all the ANGs 112, 122 and 142. The MCS 172 is used to establish a connection with each ANG. Preferably, each ANG has an "always on" management connection to the ASP 170. Each ANG can register its local information (IP address, application ports, availability, and other attributes) with the MCS 172. ASP 170 contains a location server 176, which maintains the location information for all the ANGs in the network. Additionally, when an ANG (e.g., the ANG 112) needs to locate another ANG (e.g., the ANG 122 or the ANG 142), they may obtain the distant end ANG information from the MCS 172, if not already resident in an internal table maintained in the ANG through which the call or other session originates.

In the following description, the description of the operation of the ANG 112 will be used to illustrate the operation of all the ANGs 112, 122 and 142. Although the methodologies discussed herein are applicable to a variety of different types of communications, for purposes of teaching examples of the techniques the discussion herein will focus mainly on telephone type communications. Hence, the discussion of the premises and customer equipment, particularly with respect to those shown in FIG. 1, will largely focus on endpoint devices of types used for telephone communications.

The ANG 112 of the home 110 includes a WAN termination interface and a LAN termination interface. The ANG 112 includes two local endpoint devices: a kitchen Analog Telephone Adapter (ATA) 114 and a bedroom IP phone 116. Each endpoint device is assigned a local extension off of the ANG 112. Each endpoint device may have one or more unique telephone directory numbers (DNs), which is a network address from a telephone user perspective such as a telephone directory number in the telecommunication network, associated with it. In the illustrated example, both endpoint devices share the same telephone directory number (19725551122). Further, a Network Address Translation (NAT) function and other functions may be implemented by the ANGs, but it is not necessary to have these functionalities for implementing the proposed routing method.

As illustrated, the home 120 is similar to the home 110, with the exception of the telephone directory numbers and local extensions. It should be noted that a telephone directory number may be used across different homes or other user premises. For example, the same telephone directory number may be used for the home 110 and the home 120 (or for a home and an office, etc.). The home 130 includes a standard telephone connected to the PSTN 106. The home 140 is similar to the homes 110 and 120, but includes only one local endpoint device, a bedroom IP phone 144 with a telephone directory number of "12144441122" that is coupled to the ANG 142. The home 110 has the home 120 and home 130 as its "buddies." Specifically, the ANG 112 of the home 110 is aware of the status and other attributes of the ANG 122 of the home 120 and the fact that the home 130 is on the PSTN 106.

The ASP 170 has the information regarding all of the possible, allowable destinations to which each ANG can terminate a media session. A voice call is an example of a media session. The ASP 170 may download the well-known session termination address information to the ANG 112 at the time of initialization, periodically, or upon a session destination endpoint information change. In the case of voice service, the ASP 170 downloads to the ANG 112, the IP addresses for all of the frequently contacted endpoint devices—referred to as "buddies"—to which the ANG 112 can terminate a call, as well as any SIP redirectors (e.g., SRS 178), PSTN gateways (e.g., PSTN service provider 162) or session border controllers (e.g., SBC 174) of which it needs to be able to contact to terminate a call. When a call is placed by an endpoint device off of a local ANG such as the ANG 112, the call processing module in the ANG will look at its local call routing and IP routing tables; and the module of the ANG routes the call promptly to that endpoint device. If it does not have a perfect match, the call will get routed to one of several available default gateways. The routing tables are created upon initialization or during a regularly scheduled update by the ASP 170. The use of the routing table eliminates the need for the ANG to perform a network address lookup to find a SIP redirector, a Domain Name System (DNS) server, or a server that can translate a PSTN-type number to an IP address. The elimination of the network address lookup operation decreases the post-dial delay in establishing the session to the desired destination.

Location updates are performed at the time of ANG startup or when IP or port changes occur on an ANG (e.g., the ANG 112). There is no predefined time of the validity of the addresses, and the last update is always considered valid. Thus, the ANGs do not need to update location information on a periodic basis.

Figure 2:
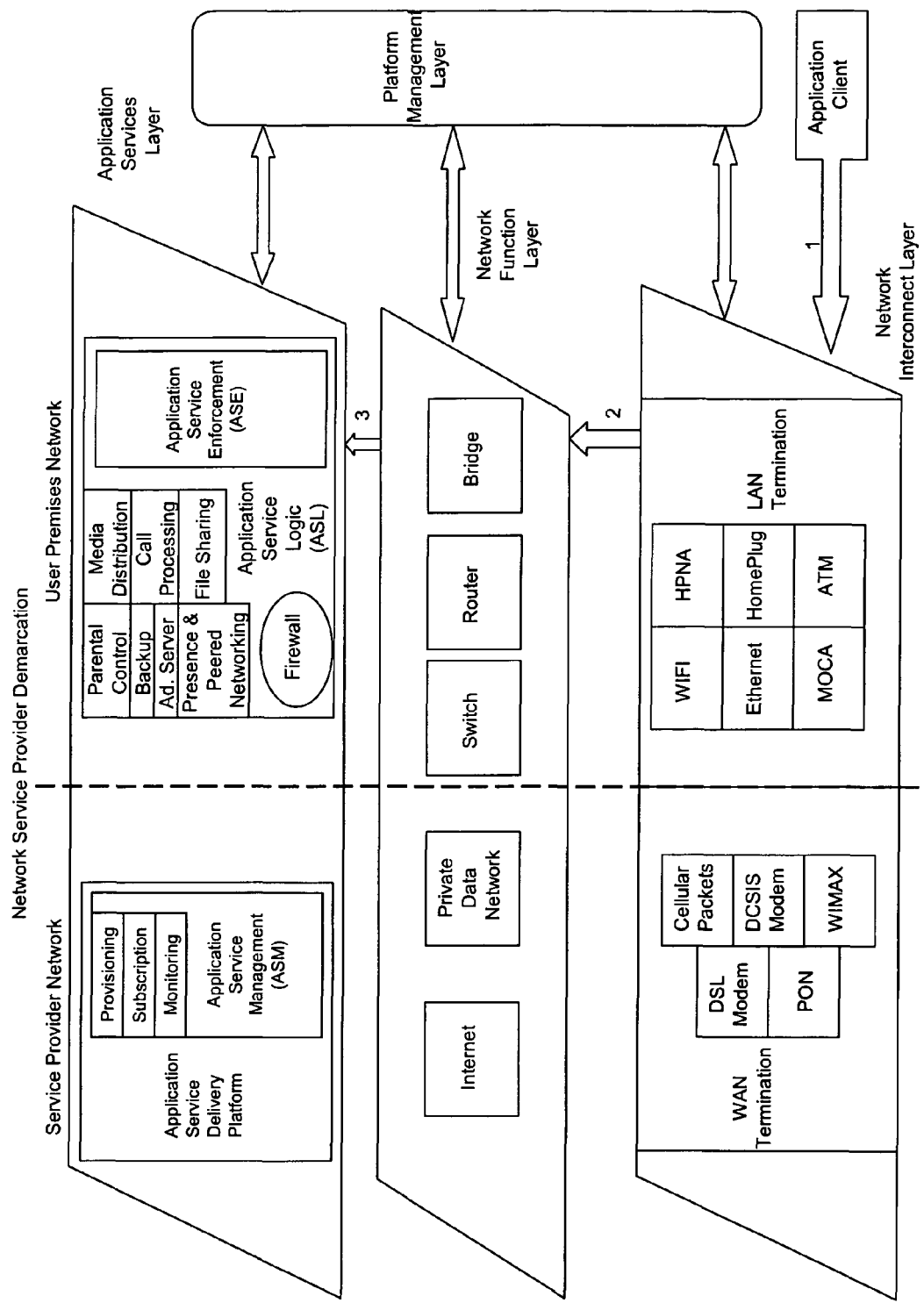
FIG. 2 is a layered logical block diagram with arrows representing steps of a sample logical flow, for an application client to access a specific managed application service, in a gateway device (e.g., ANG)-service management center type network configuration.

FIG. 2 is a high-level diagram of the architecture of the network 100 shown as a gateway-service management center network, as well as the logical flow of how a specific Application Client residing at a User Premises (e.g., the home 110) could interact with an Application Service in a gateway device (e.g., ANG 112) that is being managed in the gateway-service management center network configuration. Heretofore, as described above, many application services that form part of the Application Service Delivery Platform were logically positioned at the AS Layer but on the network side of the Network Service Provider Demarcation (see FIGS. 19 and 20). FIG. 2 shows that, in the exemplary architecture, many of these application service functionalities that were previously offered from network-side servers have now been moved across the Network Service Provider Demarcation and now logically reside at the AS Layer in the User Premises Network, i.e., on the hardware components located in the user premises, such as, by example, a gateway device or ANG. In particular, the programming that implements application services is logically positioned on the user premises side of the Network Service Provider Demarcation. The application service on the user premises side that enforces authorization, authentication, configuration, or use of the respective service via an endpoint device is logically depicted in FIG. 2 as the ASE module in the AS Layer of the User Premises Network. The ASE module may also communicate via the wide area network with the ASM logic residing in the service management center.

The ANG may be implemented using various hardware and software, and elements of the ASP system may be implemented using various server hardware and software platforms. However, the examples discussed herein also implement a new paradigm for managed application service delivery, with improved convenience for the user and easier management for the application service provider. FIG. 2 thus depicts an implementation of the ANG and the ASP system(s) in which the ASL and the ASE functions of the application server have moved to the User Premises side. In the example of FIG. 2, the application client would be implemented on an endpoint device, whereas other elements/functions to the right of the Network Service Provider Demarcation are implemented in a gateway device. As discussed more below, the ASL and the ASE functions are implemented as high-level server type logic within the gateway device at a user premises, such as an ANG in one of the homes shown in FIG. 1 and discussed above. Hence, elements shown in FIG. 2 that may reside in the user premises gateway device include the user premises-side network function or NF (switch, router or bridge) and the LAN termination for communication with the endpoint devices implementing the application client functions. Thus, with reference to FIG. 2, the first interface, as described above, for enabling bi-directional network layer communications on the user's side of the premises with one or more of the associated endpoint devices resides at the NI Layer and provides the LAN Termination referenced therein. FIG. 2 also depicts the WAN termination providing connectivity to the wide area network (network-side NF—Internet or private wide area data network). The gateway device's second interface, as described above, for enabling bi-directional network layer communications for the associated endpoint devices via a wide area network resides at the NI Layer and provides the WAN Termination referenced therein. The gateway device's second interface also enables bi-directional communications between it and the service management center via the WAN.

With reference to FIG. 2, the core of the logical capacities of the service management center resides on the Service Provider Network, and is depicted as the Application Service Management (ASM) portion of the Application Service Delivery Platform in the AS Layer. The ASM function is implemented in the service management center, which is external to the user premises, and, perforce, on the network side of the Network Service Provider Demarcation. The ASL and ASE functions maintain logical connectivity or interaction with the Application Service Management (ASM) function in the service management center, typically via communication through a wide area network. This logical connectivity is established through an always-on (or on an as needed, periodic basis), secure communication channel between the User Premises AS Layer (ASL and ASE) and the Service Provider AS Layer (ASM) at the service management center. The service management center and the communications of the center with one or more of the gateway devices provides an infrastructure support and/or management of the application services offered to endpoint devices and their users by the logic implemented in the gateway device(s). Effectively, the ASD, considered in its entirety, extends all the way to the User Premises and traverses the Network and Network Service Provider Demarcation. The secure communications channel is established through the NF Layer and the NI layer.

The examples discussed herein also introduce a logical platform management layer to the user premises-side, which allows for inter-layer allocation of local resources. This function guarantees access between the Application Service Logic function on the user premises network and the applications service management function in the service management center by assuring that the local user premises hardware and software modules are functioning at a required state (CPU and memory usage, bandwidth usage, QoS settings, etc.) in order for the ASL to have the necessary resources to establish its required communications path to the ASM.

The platform management layer is also responsible for implementing that part of the managed application services to be performed by the gateway device. In that regard, the platform manager secures and manages the overall hardware platform, given that in this scenario, the NF layer and the AS layer reside on one hardware platform. This secure hardware platform provides a robust and secure operating environment for the AS Layer. So, to establish a secure and robust hardware operating environment, the platform manager must interface with all the layers above it and allow for bi-directional management information flow among all of the functions. For example, if the Application Client is a telephony application and the desired application is call processing, the application must first connect to the LAN termination interface (1). Then a connection must be established to the AS Layer through the NF layer (2). At this point the platform manager determines if there are sufficient resources available for this to take place on the routing and switching modules and if there is not sufficient resources on either the LAN Termination interface or the NF layer functions, it would take the necessary corrective measure to free up the required resources so that the application can execute properly (e.g. prioritize packets, throttle bandwidth, attempt to reduce noise on an RF interface, or free up time slices on a TDMA interface such as MOCA). Once that is done, the connection is established to the AS Layer (3), where the ASE and ASL, having been updated by the ASM in the network, respond instantaneously to the Application Client, completing the service request.

Application services represent functionalities, implemented in the higher layer(s) of the protocol or logical stack above the network layer(s) that may extend up to the top application layer (layer 7 of the OSI model). An application service, for example, provides application server communication with a client functionality of one or more endpoint devices, for the respective service, communicated on top of network layer communications through the interfaces. In the examples, the services are provided on a subscription service basis to users at the premises. Hence, the application service logic provides enforcement regarding authorization, authentication, configuration, and/or use of the respective service via the endpoint devices. The application service includes service and feature functions, implemented and controlled by the application service logic. Management of the application service is based on communications with the service management center via the wide area network.

The illustrated architecture of the gateway device-service management center network enables other features and capabilities that have not previously been available to the user. For instance, peer to peer application communication between or among gateways is possible without the need to go through, or utilize resources at, an external service management center. Communications through the service management center are also possible. In addition, given the considerable functionality present in the gateway device, and its ability to manage the various endpoint devices associated with it (as explained below), the user interface with the gateway can be presented and utilized on the home TV. Additionally, information from other endpoint devices, such as the PC, network sources (such as an RSS (Really Simple Syndication) service), may now be overlaid on the TV screen so that, for example, PC messages, or weather information, can be viewed on the TV screen, and the functionality of the PC (or other home-networked endpoint devices) can be accessed from the TV screen.

As shown by the discussion of FIG. 2, application service programming is logically positioned on a user premises side of a logical network demarcation forming an edge of the wide area network at the user premises, that is to say on the user premises side of the Network Service Provider Demarcation. The gateway device programming however, also defines a logical service provider-user demarcation between the user premises and the application service provider, as will be described in more detail with regard to FIG. 15, further below. A more detailed example of the hardware and software of a gateway device or ANG will be discussed with regard to FIGS. 15-17. However, first we will consider a number of examples or the session routing and related configuration or set-up processes.

Figure 3:
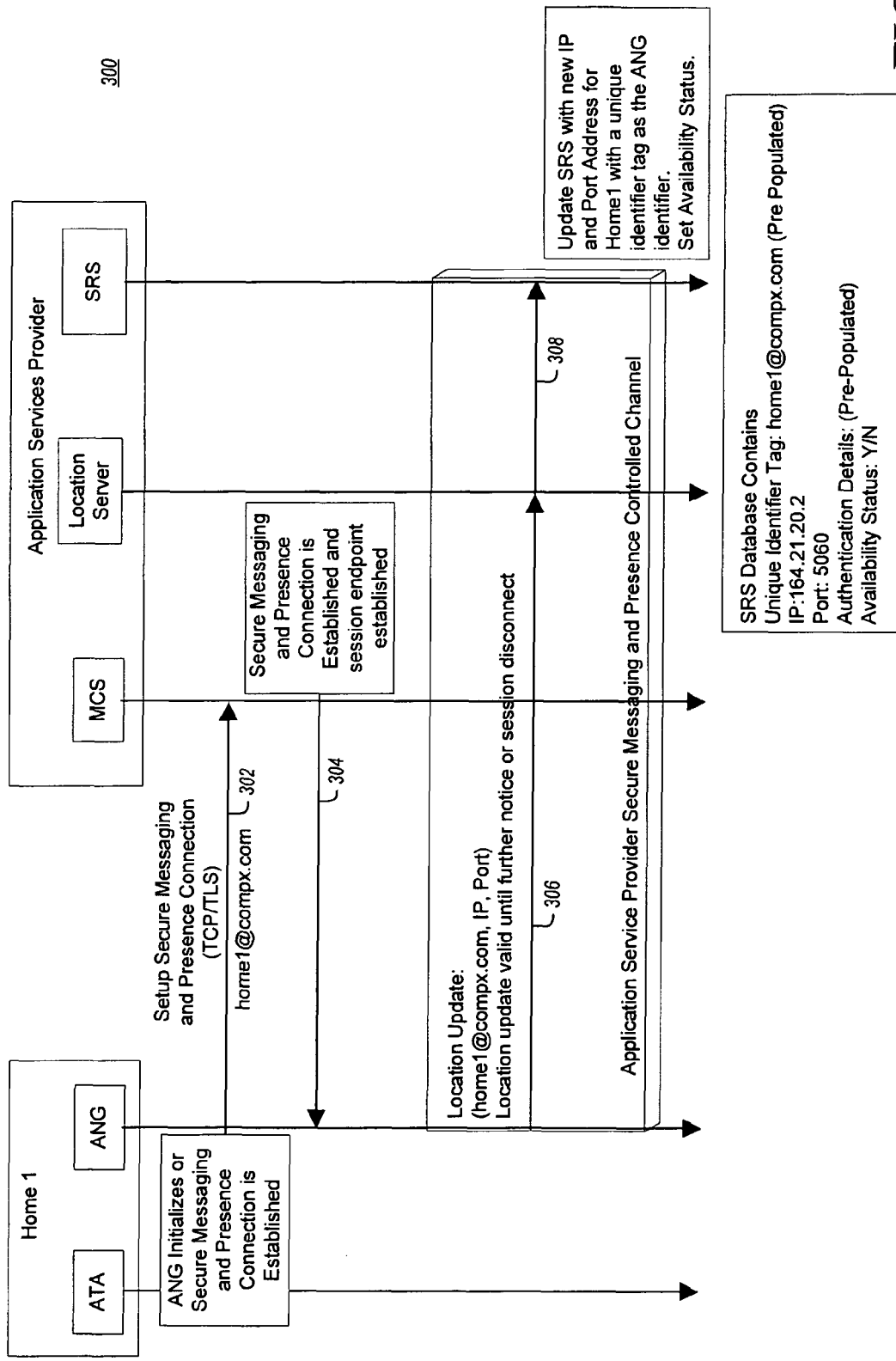
FIG. 3 is a flow diagram of a location update operation during a start-up operation of the ANG.

FIG. 3 is a flow diagram for an ANG initialization process 300 depicting how an ANG such as the ANG 112 of the home 110 establishes a secure connection with the ASP 170, updates the ASP 170 with its availability, IP address and application port selection. In step 302, the ANG 112 initializes and contacts the MCS 172 of the ASP 170 to establish a secure messaging and presence connection. The connection will be established using a Transport Layer Security over Transmission Control Protocol (TCP/TLS). In step 304, the ASP 170 establishes the secure messaging and presence connection and a session endpoint is established. In step 306, the location server 176 of the ASP 170 with the information for the ANG 112 as described above, including a unique ID tag (home1@compx.com), an IP address (164.21.20.2), a port selection (5060), and a status (Y). ANG 112 can provide less information to the ASP 170 because the location server 176 can derive some of the information from its interaction with the ANG 112. For example, the location server 176 can set the status of the ANG 112 to be available by default if it is contacted by the ANG 112. The ANG 112 communicates with the ASP 170 over an application service provider secure messaging and presence controlled channel. As noted previously, the location update for the ANG 112 is valid until further notice or a session disconnect occurs. Once the ASP 170 has been updated with information for the ANG 112, the ASP 170 will store that information and provide it to the other ANGs that may be interested in communicating with the home 110, such as the home 120.

Figure 4:
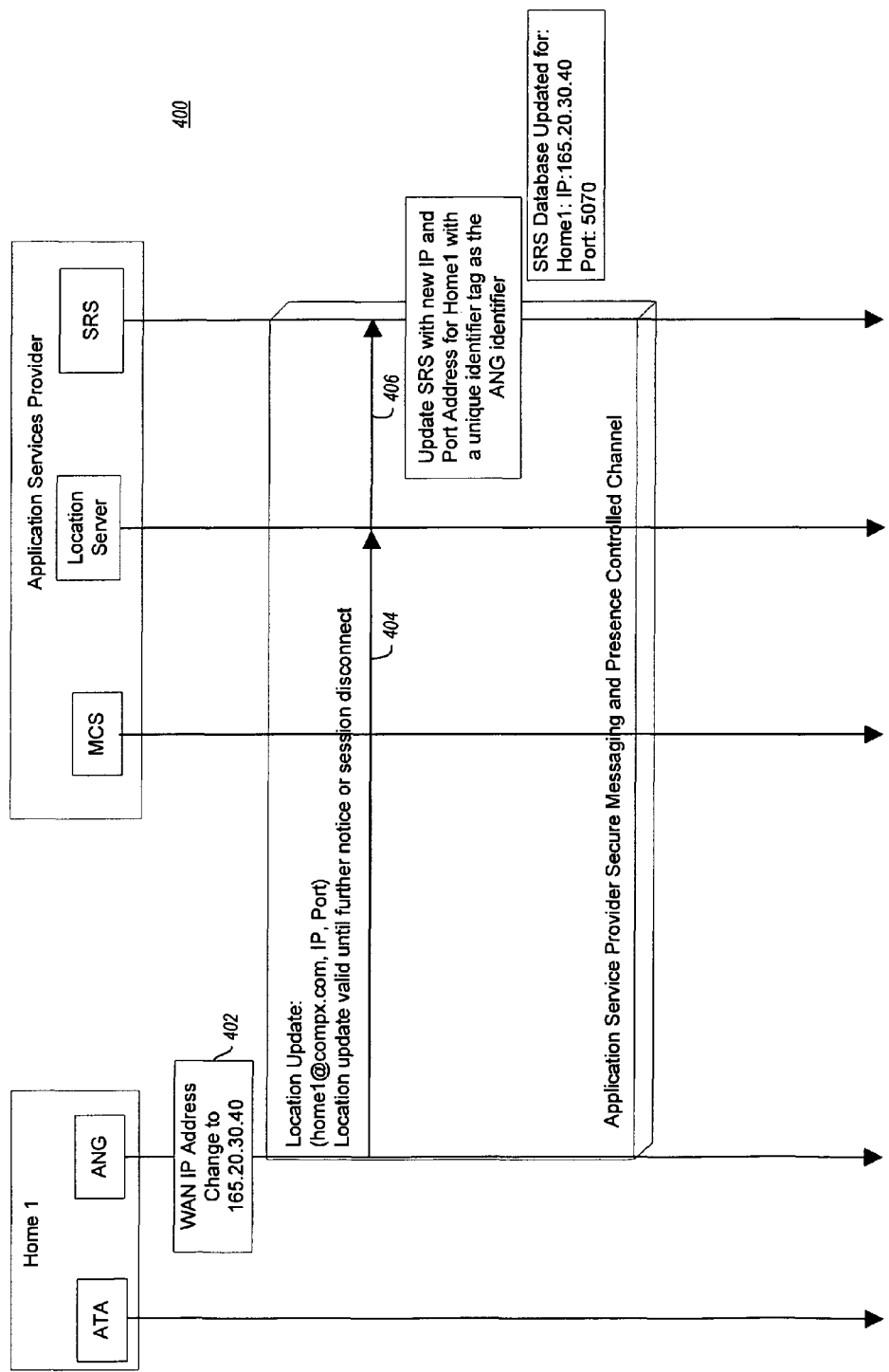
FIG. 4 is a flow diagram of a location update operation during a network address change of the ANG.
Figure 5:
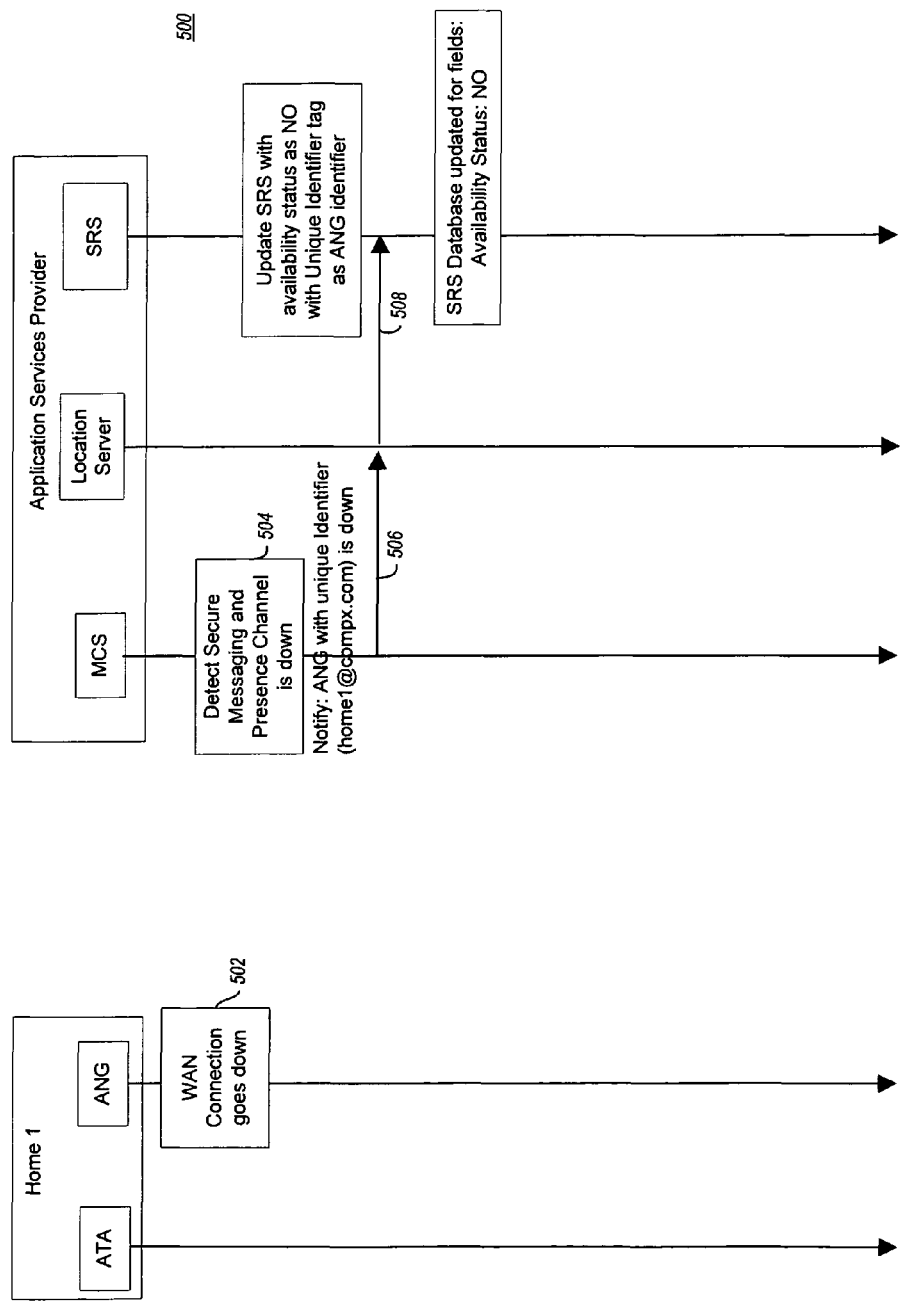
FIG. 5 is a flow diagram of a location update operation during a disconnect of the ANG.

FIG. 4 and FIG. 5 depict the logic for creating and updating information for the ANGs in a dynamic address table on the ASP 170 at a time not related to a particular application session initiation (e.g., voice call). Specifically, the logic illustrates the process for the ASP 170 to be updated with the latest information about a particular ANG upon the change of status of the ANG, such as an IP address change or a disconnect from the network.

FIG. 4 is a flow diagram for an IP address update process 400 depicting how the ANG 112 updates the information on the ASP 170 for the ANG 112 after the ANG 112 has experienced an IP address change. In step 402, ANG 112 has changed its IP address on the WAN interface from 164.21.20.2 to 165.20.30.40. In step 404, ANG 112 sends an update message to the location server 176 of the ASP 170 along with its unique ID tag (home1@compx.com) and port selection (5070). The update message is sent over application service provider secure messaging and presence controlled channel. In step 406, the location server 176 provides the information to the SRS 178 to update the SRS database 180.

FIG. 5 is a flow diagram for a status update process 500 depicting how the ASP 170 updates information for the ANG 112 when the ANG 112 has become disconnected from the ASP 170. In step 502, the ANG 112 has become disconnected from the ASP 170. The disconnection may have occurred due to a powering down of the ANG 112 (either intentionally or unexpectedly), an equipment malfunction, or a network disconnection, such as the WAN link between the ANG 112 and the ASP 170 becoming disconnected. In step 504, the MCS 172 detects that the secure messaging and presence controlled channel has gone down, and, in step 506, the MCS 172 will notify the location server 176 that the ANG with unique ID tag (home1@compx.com) (i.e., the ANG 112) has gone down. The location server 176 will update the SRS 178 in step 508 and the SRS database 180 will be updated to reflect that the ANG 112 is currently unavailable.

Figure 6:
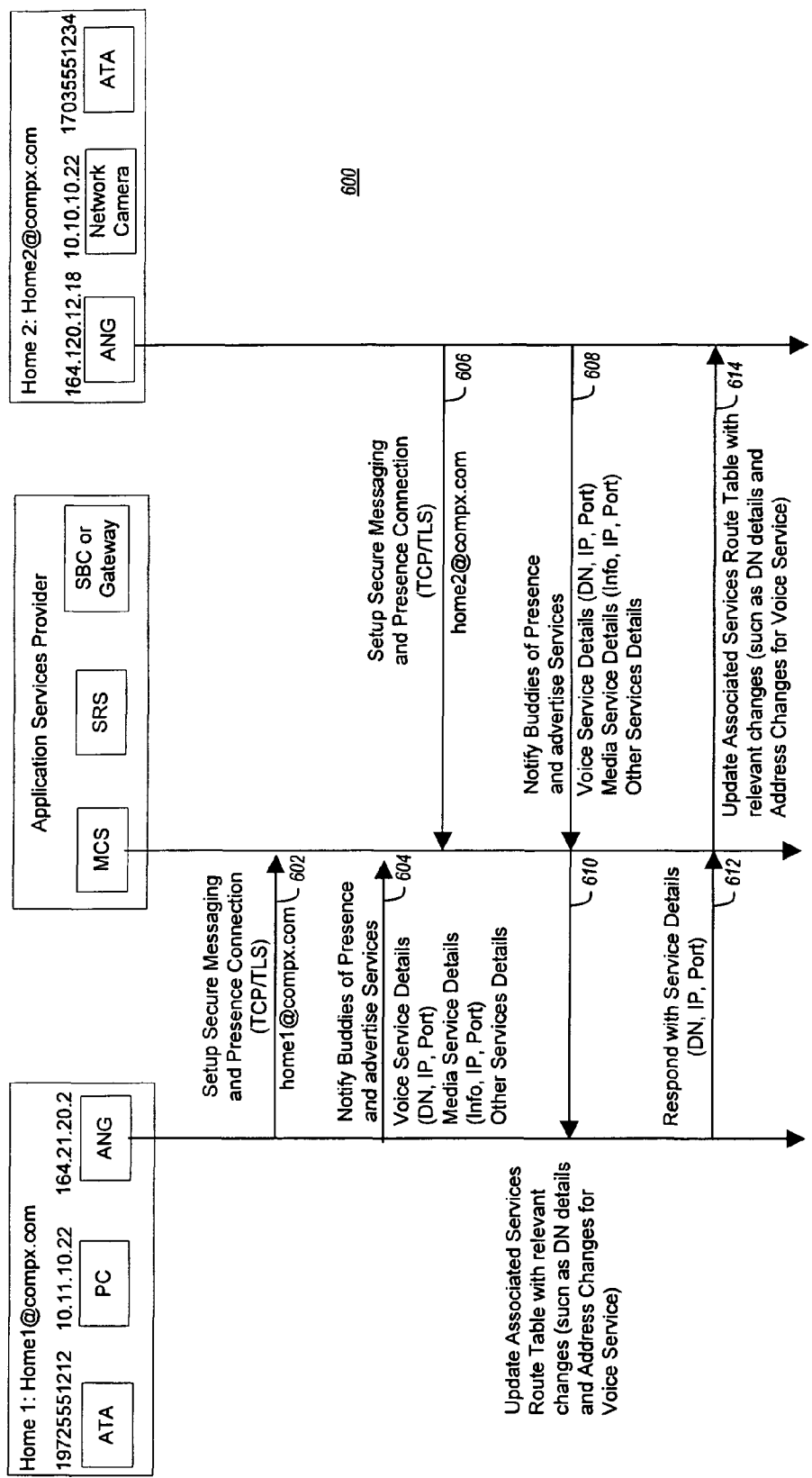
FIG. 6 is a flow diagram of an attribute exchange operation of two ANGs.

FIG. 6 is a flow diagram for a status update process 600 depicting how two ANGs that are both managed by the ASP 170, such as the ANG 112 in the home 110 and the ANG 122 in the home 120, communicate their attributes with each other. Each ANG establishes a secure communications channel with the MCS 172 of the ASP 170. Once a connection is established, the ANGs can get the distant end routing information if they do not have it already. Further, once each ANG knows where the other ANG is located, they may establish a direct peer to peer connection and update their application routing tables and attributes with each other's information. Referring again to FIG. 1 as well as continuing to refer to FIG. 6, in step 602, the ANG 112 of the home 110 establishes a secure messaging and presence connection using TCP/TLS with the MCS 172 of the ASP 170. Thereafter, in step 604, the ANG 112 notifies the MSC 172 of the ASP 170 of its presence and advertises its services, including any details necessary for another endpoint device to set up a session with it. For example, ANG 112 may send the voice service details such as DN (19725551212), IP (164.21.20.2) and port (5060) to the MCS 172 of the ASP 170, in addition to its status. Thereafter, when another ANG that is a buddy of the home 110 comes online, the ANG 112 of the home 110 may be notified of its status and available services and update its routing table accordingly. For example, in step 606, the home 120 comes online and sets up a secure messaging and presence connection over TCP/TLS with the MCS 172 of the ASP 170 in a similar fashion as when the ANG 112 of the home 110 is available (i.e., comes online). Then, in step 608, the home 120 notifies the MCS 172 of the ASP 170 of its presence and advertises the services that it supports. For example, the home 120 may provide voice service details such as its DN (17035551234), IP (164.120.12.18) and port (5060). The MCS 172 and the ANG 112 of the home 110 will update the information stored in their respective route tables for the ANG 122 of the home 120 in step 610. After the ANG 112 of the home 110 has update the information it has for its buddy, the home 120, it will respond with service information in step 612 to the MCS 172 of the ASP 170 and the ANG 122 of the home 120 will update its routing table with the voice service details for the ANG 112 of the home 110. An ANG may provide details for all the services it offers to its buddies, regardless of whether a particular buddy also supports those services. In that situation, the receiver of the information may then decide what information it will maintain. In the alternative, an ANG may only provide information to another ANG for the services that the ANG knows the other ANG supports.

Figure 7:
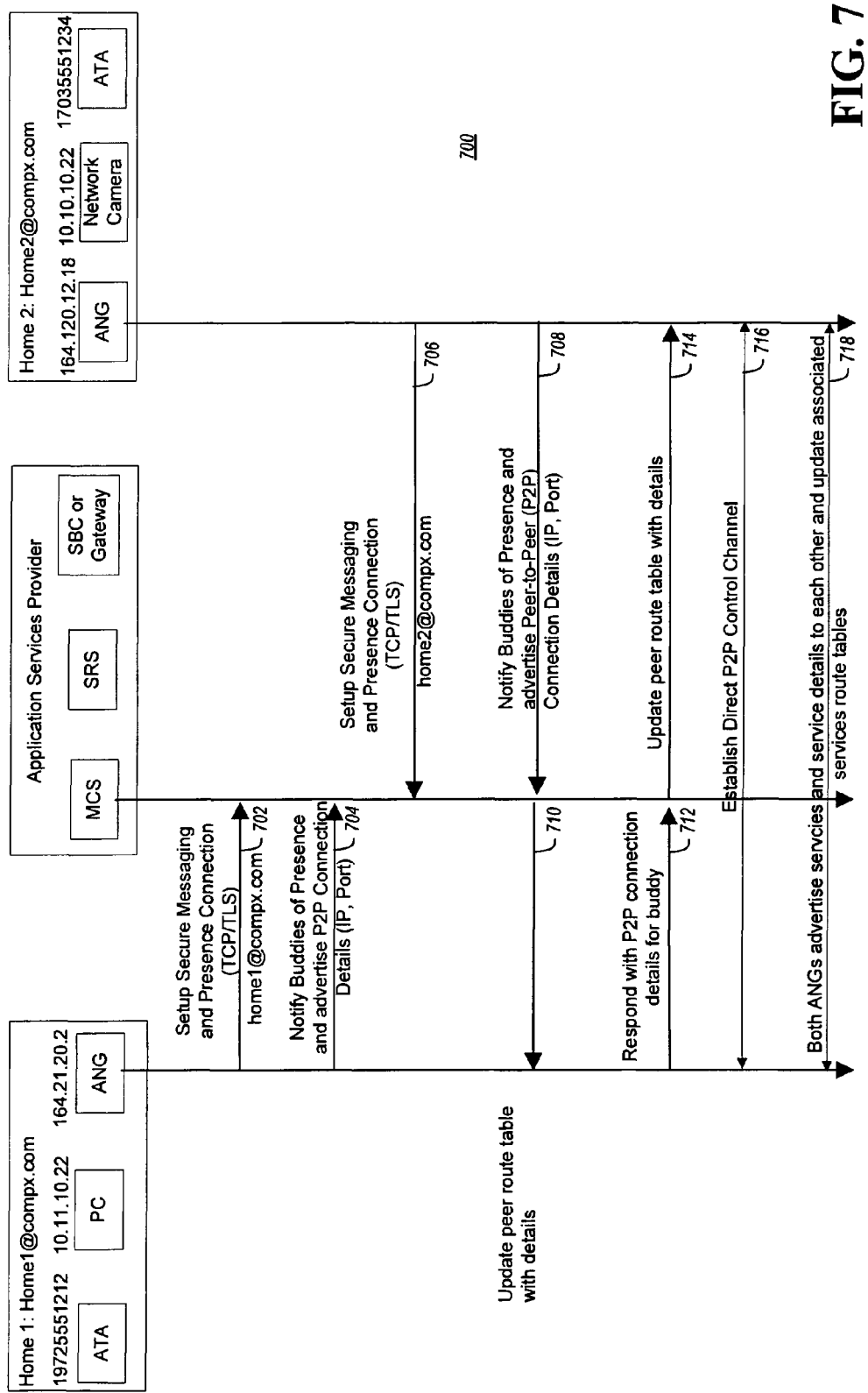
FIG. 7 is a flow diagram of an application services detail advertisement operation of an ANG in a peer to peer manner.

FIG. 7 illustrates a peer to peer establishment process 700 wherein the ANG builds a list of buddies or often dialed numbers of On-Net numbers. Indications of Off-Net or On-Net status of dialed numbers can be established by indicators in the call responses or can be done as out-of-band queries to the directory services in the ASP 170. Once DN to On-Net status is established, the ANGs can advertise service detail for application services (in this case, voice), in a peer to peer (P2P) manner. In step 702, the ANG 112 of the home 110 establishes a secure messaging and presence connection using TCP/TLS with the MCS 172 of the ASP 170. Thereafter, in step 704, the ANG 112 notifies the MSC 172 of the ASP 170 of its presence and advertises its P2P connection services, including any details necessary for another endpoint device to establish a P2P session with it. For example, ANG 112 may send the P2P service details such as IP (164.21.20.2) and port to the MCS 172 of the ASP 170, in addition to its ability to provide P2P services. Thereafter, when another ANG that is a buddy of the home 110 comes online, the ANG 112 of the home 110 may be notified of its status and available services and update its routing table accordingly. For example, in step 706, the home 120 comes online and sets up a secure messaging and presence connection over TCP/TLS with the MCS 172 of the ASP 170 in a similar fashion as when the ANG 112 of the home 110 is available (i.e., comes online). Then, in step 708, the home 120 notifies the MCS 172 of the ASP 170 of its presence and advertises the P2P services that it supports. For example, the home 120 may provide P2P service details such as its IP (164.120.12.18) and port information. The MCS 172 and the ANG 112 of the home 110 will update the information stored in their respective route tables for the ANG 122 of the home 120 in step 710. After the ANG 112 of the home 110 has update the P2P information it has for its buddy, the home 120, it will respond with P2P service information in step 712 to the MCS 172 of the ASP 170 and the ANG 122 of the home 120 will update its routing table with the P2P service details for the ANG 112 of the home 110. The ANG 122 of the home 120 will then update its routing tables with P2P details in step 714, and a direct P2P control channel can then be established in step 716. Both the ANG 112 of the home 110 and the ANG 122 of the home 120 can now advertise services and service details directly to its buddies in step 718. For example, the ANGs can exchange DNs, IP addresses and port information directly with each other for voice services without involving the MCS 172 of the ASP 170.

Figure 8:
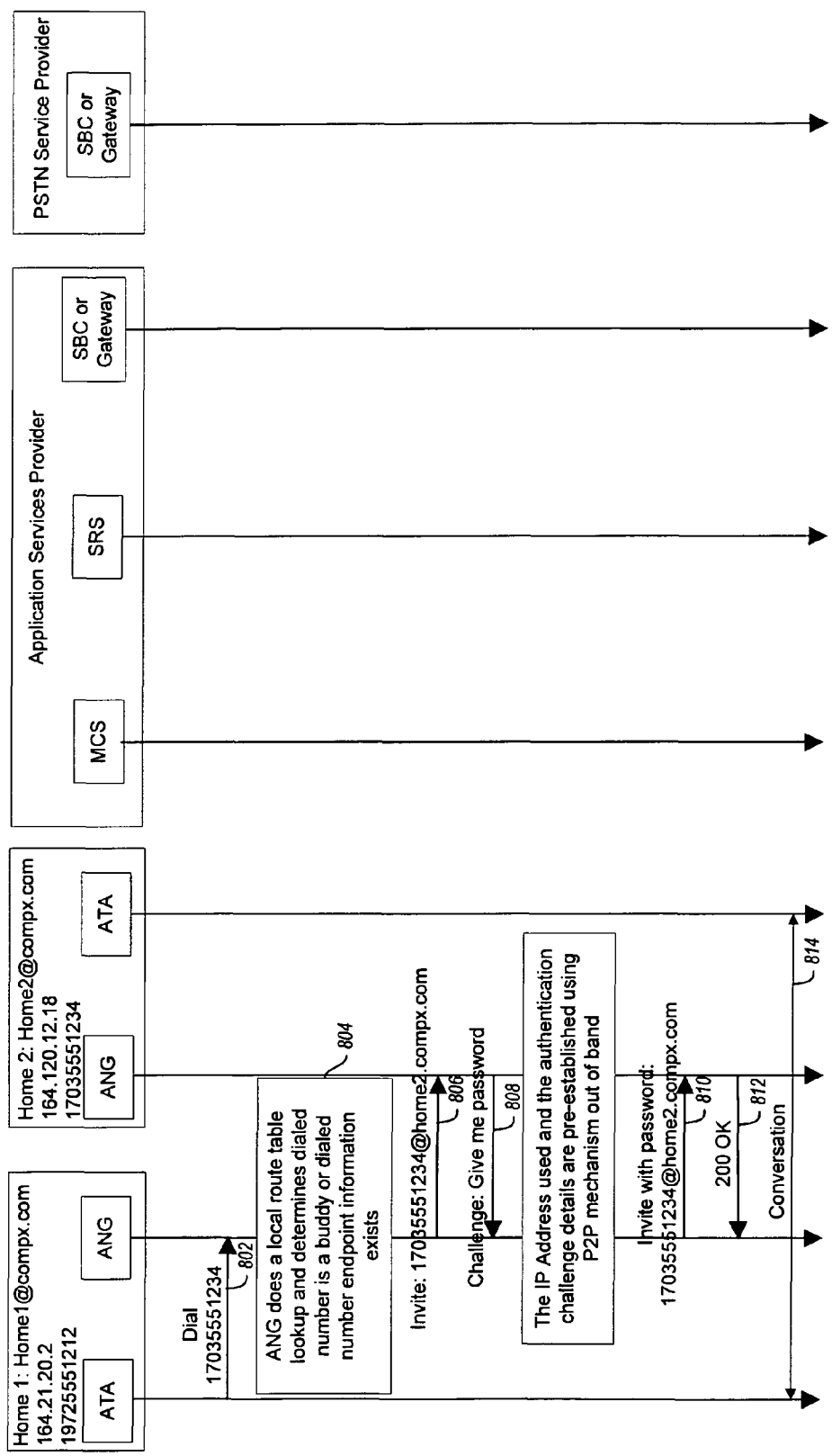
FIG. 8 is a flow diagram of an On-Net to On-Net voice call establishment operation between two ANGs after the peer to peer relationship has been established between them as described in FIG. 7.

In FIG. 8, a peer to peer direct voice session establishment process 800 is illustrated where one of the ATAs in the home 110 (e.g., the kitchen ATA 114) wants to establish a voice call session with one of the endpoint devices of the home 120. In step 802, the kitchen ATA 114 is used to dial the DN of the desired endpoint device or devices (17035551234) to which the voice call connection is to be established. In step 804, the ANG 112 of the home 110 will perform a lookup of its local routing table to determine if the dialed DN belongs to a buddy or if the dialed number endpoint information exists. If, as shown in FIG. 8, the ANG 122 of the home 120 is a buddy of the ANG 112 of the home 110, then the contact information and status (e.g., availability, and whether the buddy is On-Net or Off-Net) for the ANG 122 will be found in the routing table of the ANG 112. The ANG 112 of the home 110 can directly contact the ANG 122 of the home 120 by sending an invitation to the ANG 122 of the home 120 (17035551234@the home 120.compx.com) in step 806. Upon receiving the invitation, the ANG 122 of the home 120 will request a password from the ANG 112 of the home 110 by sending it a challenge in step 808. The IP address of the ANG 122 of the home 120, which is the IP address associated with the home 120.compx.com, would be used to communicate with the home 120. The IP address used and the authentication challenge details may be pre-established out-of-band using the P2P mechanisms that were described in FIG. 7 and the information stored in the local routing table on the ANG 112 of the home 110. Alternatively, instead of obtaining it directly from the ANG 122, the ANG 112 of the home 110 may look-up the IP address of the ANG 122 of the home 120 using a DNS lookup. With this procedure, the ANG 112 of the home 110 obtained the contact information and status for the device corresponding the dialed DN from its local routing table, without the need to query an external database or the like to translate the DN. In step 810, the ANG 112 of the home 110 will send an invitation that includes a password as requested by the ANG 122 of the home 120. Once the invitation has been authenticated, then the ANG 122 of the home 120 will send an acknowledgement message (e.g., "200 OK") in step 812, and a voice call session can occur in step 814. It should be noted that in the illustrated example, the acknowledgement message in step 812 uses the acknowledgement message from the SIP protocol. Other types of acknowledgement messages may be used for other protocols.

In scenario illustrated in FIG. 8, a voice call is established between two ANGs that "know" each other. That is, they each have the other's routing tables in their application routing tables. The management communications channel between the ANGs has been pre-established in a P2P manner, as described in FIG. 7. Thus, in this instance, the home 110 is simply establishing a voice call to the home 120. Since the ANG 112 of the home 110 already has the routing information for the ANG 122 of the home 120 in its routing table, and since a communications channel has already been established, the ANGs can create a bi-directional call path to each other, irrespective of any other firewalls. Additionally, no directory or database lookups are needed to complete the call. The established session could be for any kind of session, not just a voice call session.

Figure 9:
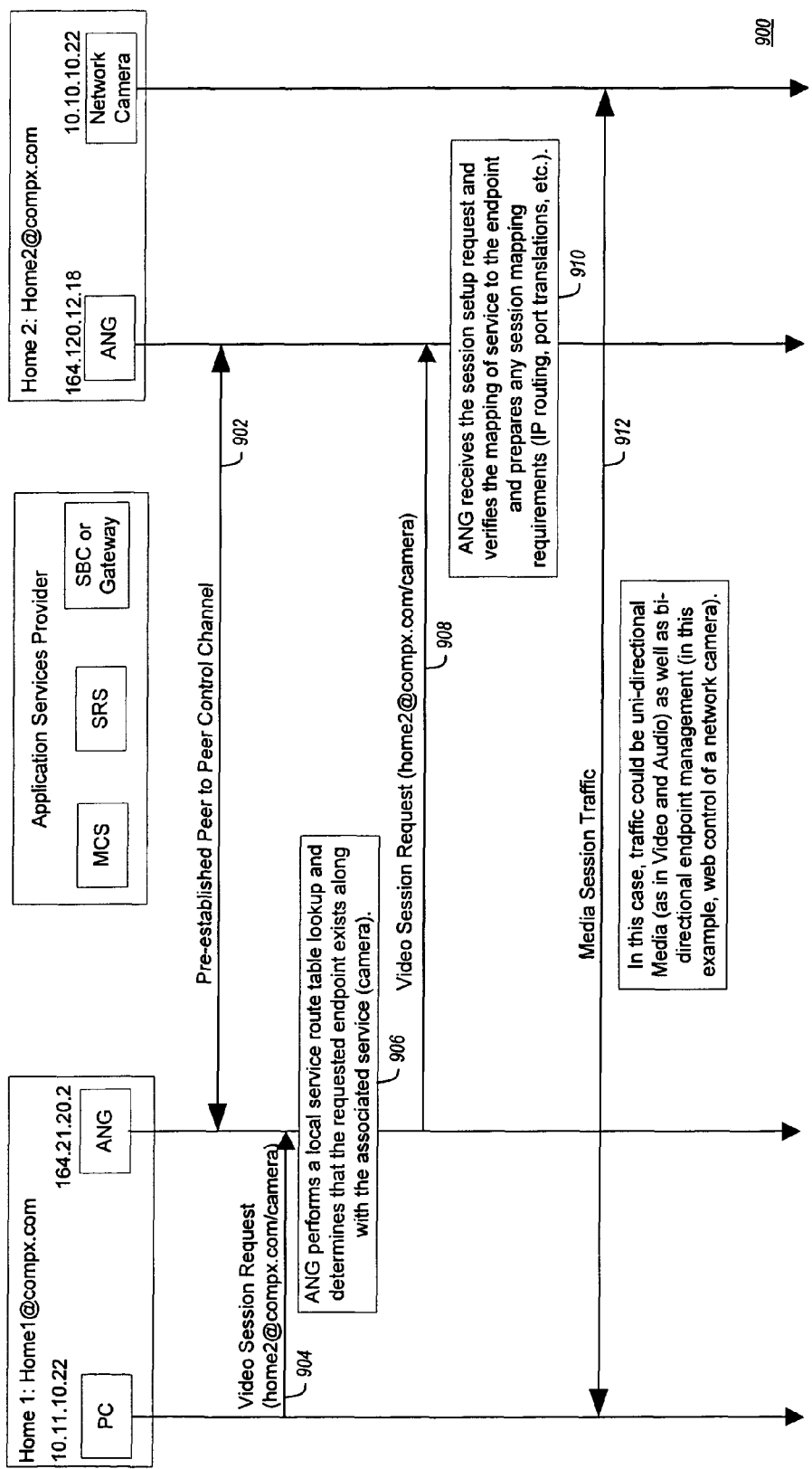
FIG. 9 is a flow diagram of an On-Net to On-Net media session establishment operation between two ANGs after the peer to peer relationship has been established between them as described in FIG. 7.

FIG. 9 is another example of how two different endpoints can establish a connection where a peer to peer connection in step 902 has previously been established by the ANGs as illustrated by FIG. 7. In step 904 the PC 118 in home 110 is requesting a media session with a network camera 128 in the home 120 (e.g., "home2@compx.com/camera"). For this to happen, in step 906 the ANG 112 in the home 110 must be aware that a "camera" session is a service that is associated with the home 120 and that the home 120 has allowed the home 110 to establish a connection to it. Then, in step 908, the ANG 112 of the home 110 will send the request to the ANG 122 in the home 120. The home 120 must properly map the session capabilities of the network camera 128 with the advertised services for the "camera" session. This means that the ANGs must be aware of multiple protocols and applications and their corresponding endpoints and be able to correctly map the corresponding service request with the appropriate endpoint and carry out what ever routing, translations, etc., that may be necessary to complete the connection. That is, in step 910 the ANG 122 of the home 120 must perform any protocol mappings that may be necessary or any routing translations that may be required in order to allow an authorized external device (such as the PC 118 in the home 110) to establish a session with the network camera 128. In step 912, the media session is established.

Figure 10:
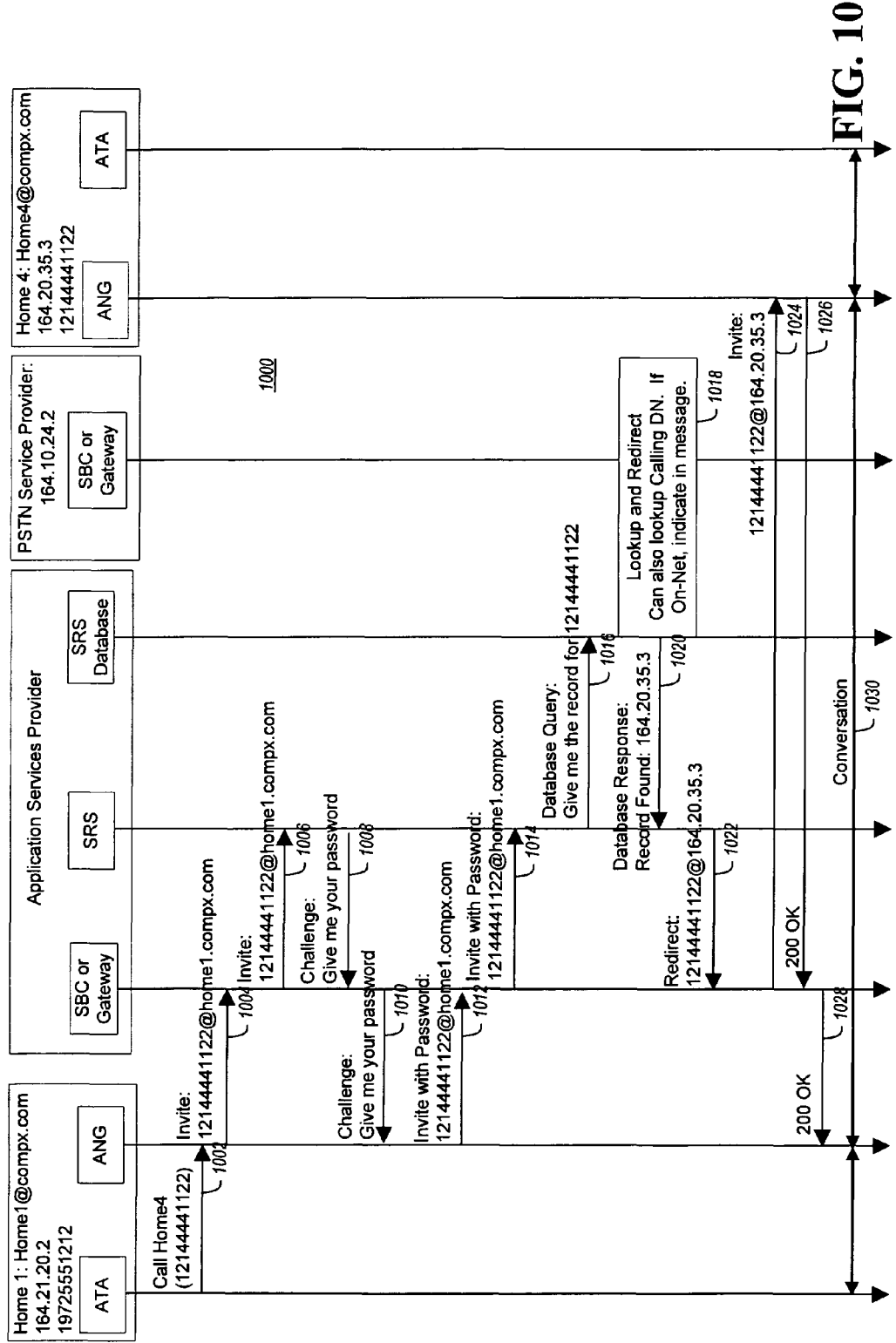
FIG. 10 is a flow diagram of an On-Net to On-Net call establishment operation wherein the two ANGs have not established a peer to peer relationship.

The above examples illustrate On-Net to On-Net calls where the ANG from which the application session is being established (e.g., the ANG 112 of the home 110) has the routing information for the ANG to which the request is to be sent (e.g., the ANG 122 of the home 120). FIG. 10 illustrates an instance of an On-Net to On-Net call where the calling ANG does not have the routing information for the destination ANG in its local routing table; and therefore it must go to the ASP in order to locate the routing information. In this instance, the ASP has the routing information for the requesting ANG and provides it to the requesting ANG. It is possible for subsequent calls from the requesting ANG to the destination ANG to not go through the ASP, and instead, for the requesting ANG and destination ANG to establish a P2P connection instead. In addition, the destination ANG will have the information to contact the requesting ANG in subsequent calls where the destination ANG will act as the initiator of the voice session.

In step 1002, one of the ATAs in the home 110 (e.g., the kitchen ATA 114) wants to establish a voice call session with one of the endpoint devices of the home 140. Specifically, in step 1002, the kitchen ATA 114 is used to dial the DN of the desired endpoint device (12144441122) to which the voice call connection is to be established. In step 1004, the ANG 112 of the home 110 will request the information from ASP 170 by sending an invitation to the SBC 174 of the ASP 170 (12144441122@home1.compx.com). As previously discussed with respect to FIG. 8, the actual IP address associated with the domain (home1.compx.com) will be used in the call setup process. The SBC 174 will forward the invitation to the SRS 178 in step 1006. In step 1008, the SRS 178 will request a password in a challenge to the invitation, which is sent to SBC 174 to be forwarded to the ANG 112 of the home 110 in step 1010. The ANG 112 of the home 110 will send an invitation that includes a password as requested by the SRS 178 of the ASP 170 in step 1012. The request will be sent from the ANG 112 of the home 110 to the SBC 174, which will then forward the invitation to the SRS 178 in step 1014. Once the invitation has been authenticated by the SRS 178 of the ASP 170, then the SRS 178 will perform a database query on the SRS database 180 based on the DN (12144441122) in step 1016. The SRS database 180 may then perform a lookup in step 1018 and provide a response of the information found in step 1020. In the illustrated example, the response provided includes the IP address of the ANG 142 of the home 140 (164.20.35.3). The response may also include the domain information instead of the IP address. The response will provide an indicator if the endpoint device is On-Net. The response is returned to the SRS 178 that is then returned to the SBC 174 in step 1022. The SBC 174 will then send an invitation to the ANG 142 of the home 140 to establish a voice call session in step 1024. The ANG 142, on receiving the invitation from the SBC 174, can check for the indication of the originating party as being On-Net. Alternatively, instead of the SBC 174 sending the invitation to establish the voice call session, the ANG 112 of the home 110 can send the invitation. In step 1026, the home 140 will be sent an acknowledgement message (e.g., "200 OK") from SBC 174, and after this acknowledgement message is sent to the ANG 112 of the home 110 in step 1028, a voice call session is established in step 1030. It should be noted that future calls from the home 110 to the home 140 may be established without having to go through the ASP 170 as the home 110 and the home 140 can now establish a peer to peer relationship.

Figure 11:
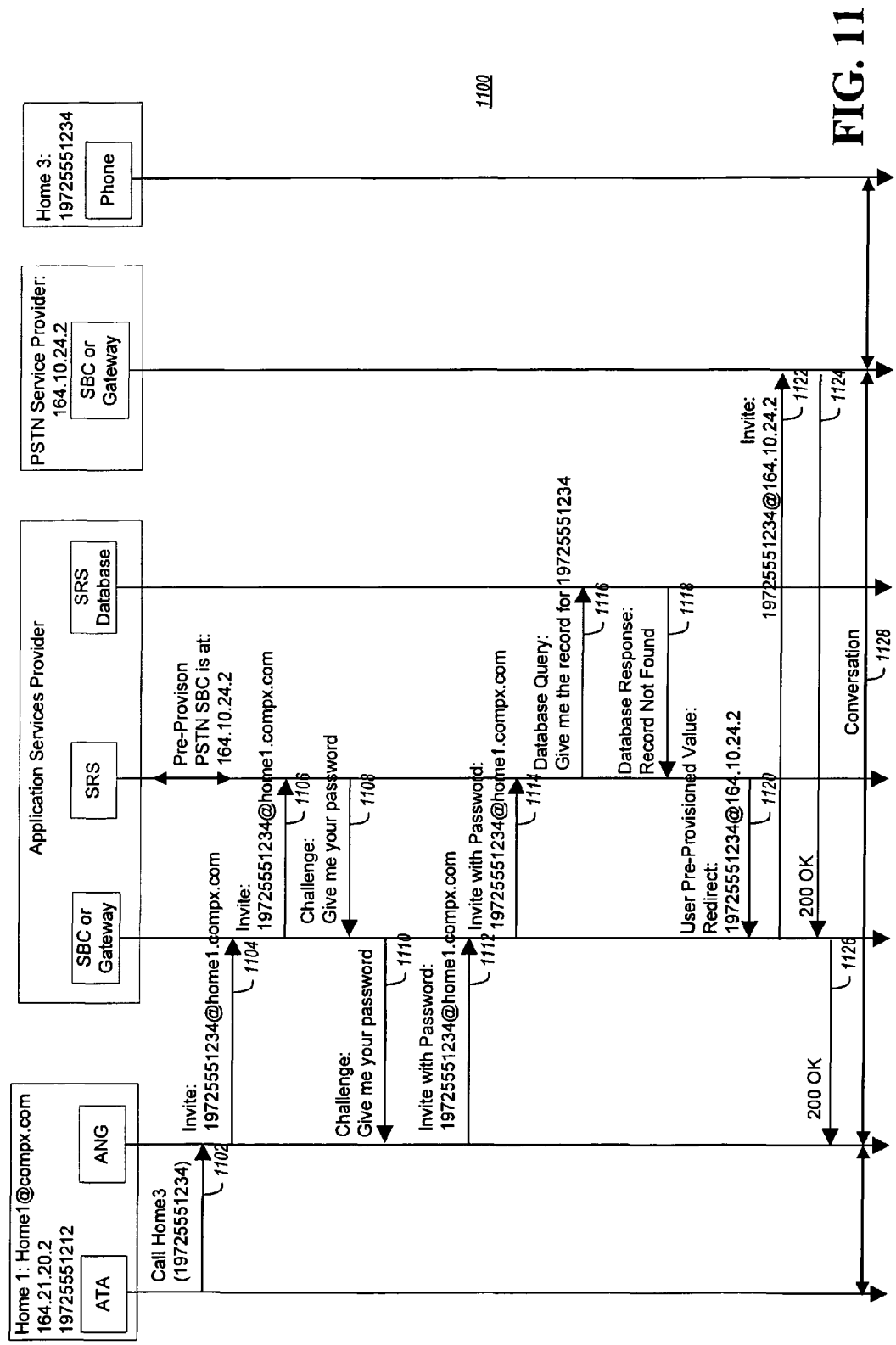
FIG. 11 is a flow diagram of an On-Net to Off-Net call establishment operation.

FIG. 11 illustrates an On-Net to Off-Net call process 1100, where the home 110 is calling the home 130, a destination that it knows to be Off-Net. The ANG 112 of the home 110 determines that calling the home 130 is Off-Net given that the entry in the routing table on the ANG 112 shows that for the ANG 112 to call the number for the home 130, the connection must be made directly to the SBC 174. Once the call gets to the SBC 174 of the ASP 170, the SBC 174 will route the call out to the SBC/gateway 164 of the PSTN service provider 162, as it knows that the endpoint device does not belong to its network since it can not find it its database. The SBC/gateway 164 is a pre-provisioned SBC/gateway to which all calls will be forwarded by the ASP 170. The call is forward to the PSTN SBC/gateway 164, and subsequently a call path is established between the two endpoint devices.

In step 1102, one of the ATAs in the home 110 (e.g., the kitchen ATA 114) wants to establish a voice call session with the home 130. Specifically, in step 1102, the kitchen ATA 114 is used to dial the DN of the desired endpoint device (12144441122) to which the voice call connection is to be established. In step 1104, the ANG 112 of the home 110 will request the information from the ASP 170 by sending an invitation to the SBC 174 of the ASP 170 (19725551234@home3.compx.com). The SBC 174 will forward the invitation to the SRS 178 in step 1106. In step 1108, the SRS 178 will request a password in a challenge to the invitation, which is sent to SBC 174 to be forwarded to the ANG 112 of the home 110 in step 1110. The ANG 112 of the home 110 will send an invitation that includes a password as requested by the SRS 178 of the ASP 170 in step 1112. The request will be sent from the ANG 112 of the home 110 to the SBC 174, which will then forward the invitation to the SRS 178 in step 1114. Once the invitation has been authenticated by the SRS 178 of the ASP 170, then the SRS 178 will perform a database query on the SRS database 180 based on the DN (19725551234) in step 1116. The SRS database 180 may then provide a response of the information found in step 1118. The response will provide an indicator if the endpoint device is Off-Net because the SRS database 180 will return the message that the record for that DN has not been found. Once the SRS database 180 indication of no record found is returned to the SRS 178, then in step 1120, the SRS 178 will send the SBC 174 a user pre-provisioned value redirecting the SBC 174 to contact the endpoint device with the DN (19725551234) using PSTN service provider 162 at the IP address of the SBC/gateway 164 (164.10.24.2). The SBC 174 will then send an invitation to the SBC/gateway 164 of the PSTN service provider 162 to establish a voice call session in step 1122. The SBC/gateway 164, on receiving the invitation from the SBC 174, can accept the invitation by sending a "200 OK" message in step 1124. Alternatively, the ANG 112 of the home 110 can send the invitation to establish the voice call session. In step 1126, the home 140 will be sent an acknowledgement message (e.g., "200 OK") by the SBC 174 forwarding the acknowledgement message to the ANG 112 of the home 110. A voice call session is established in step 1128.

Figure 12:
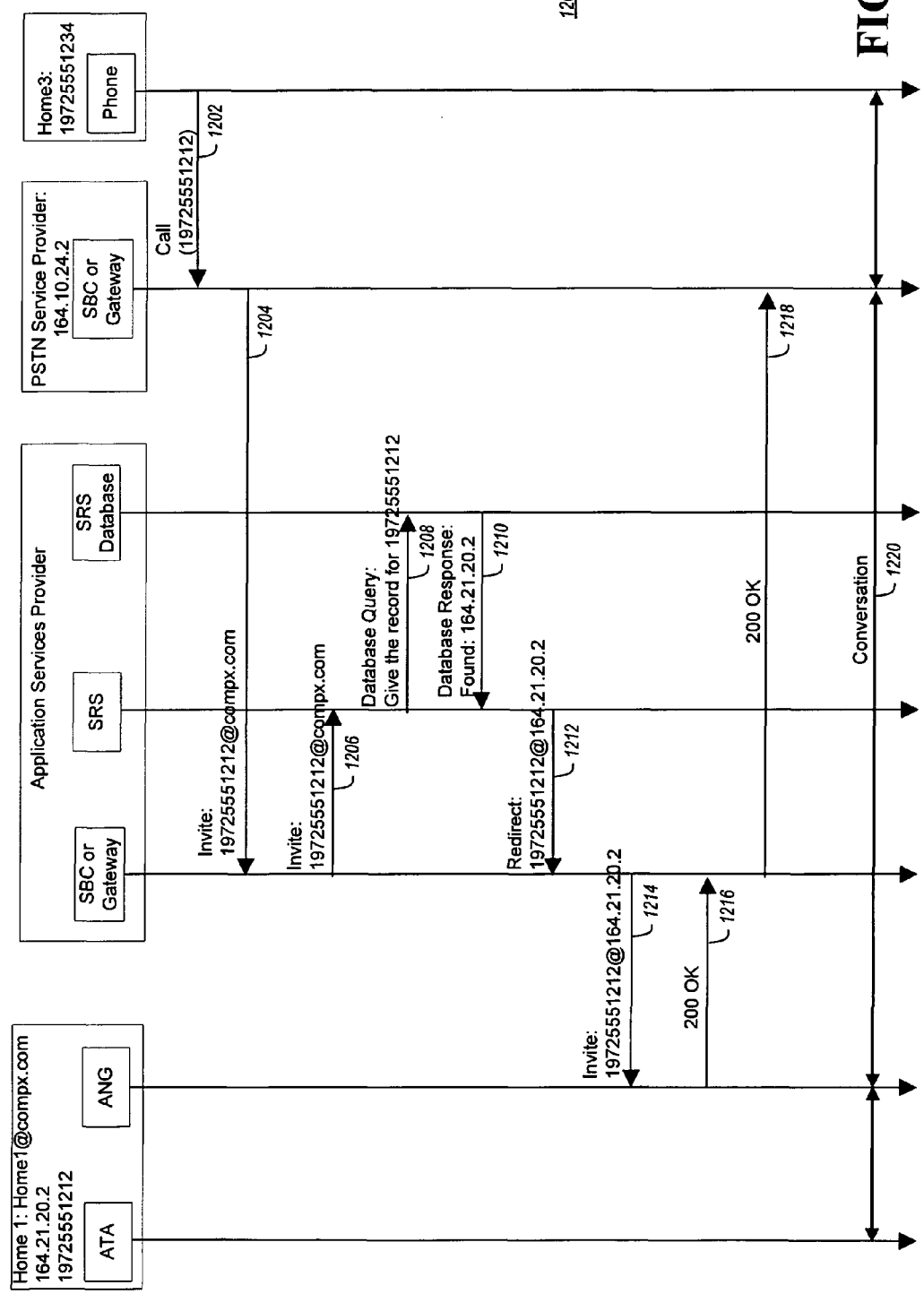
FIG. 12 is a flow diagram of an Off-Net to On-Net call establishment operation.

FIG. 12 illustrates an Off-Net to an On-Net call process 1200, where an Off-Net endpoint device (e.g., a telephone in the home 130) is calling an On-net endpoint device (e.g., a telephone device in the home 110). In step 1202, a user in the home 130 places a call to the DN of the home 110 (19725551212), which is handled by the SBC/gateway 164 of the PSTN service provider 162. The PSTN routes the call to the gateway 146 and provides the DN to that gateway, in a conventional manner. In step 1204, the SBC/gateway 164 will send an invitation to the SBC 174 of the ASP 170 (19725551212@compx.com). Once the call signally makes it to the SBC 174, it determines where the endpoint device is located by forwarding the invitation to SRS 178 in step 1206, which then performs a database query of the SRS database 180 in step 1208. The SRS database 180 returns the results (164.21.20.2) to the SRS 178 in step 1210, which then will forward found endpoint device (19725551212@164.21.20.2) to the SBC 174 in step 1212. The SBC 178 will then send an invitation to the ANG 112 of the home 110 in step 1214, and route the call directly to the endpoint device to establish the session in step 1220 once the acknowledgement message (e.g., "200 OK") is received from the ANG 112 in step 1216, and the message forwarded to the SBC/gateway 164 of the PSTN service provider 162 in step 1218.

It should be noted that the DN to IP address binding in the SRS database 180 does not have a predetermined time window. It is updated asynchronously by the location server 176, which is part of the Application Service Provider framework. However it is also possible to have a predetermined time window for the translation of telephone number to IP.

The following are exemplary routing tables that may be found in an ANG, with Table 1 illustrating an exemplary ANG call routing table for the ANG 112 of the home 110; Table 2 illustrating an exemplary IP routing table; and Table 3 illustrating an exemplary IP interface table. As described above, a gateway such as ANG 112 can act as a call set-up or session initiation server between endpoint devices. Further, a gateway can provide more higher-layer functions than just pure routing (i.e., the gateway itself can also be an endpoint device). For example, the gateway device or ANG can perform as a customer premises SIP server, and in that sense the tables described herein are similar to a higher layer (SIP) session addressing table, and not just an IP routing table.

TABLE 1

ANG Call Routing Table (Home 110)

| Destination Name/Number | Host | Routing | Discovery | Port | Status |
|---|---|---|---|---|---|
| Kitchen phone/9001 | 10.11.10.20 | Local | Dynamic | 0 | Up |
| Bedroom phone/9002 | 10.11.10.21 | Local | Dynamic | 0 | Up |
| Home 110/ +19725551122 | home1.compx.com | Local | Dynamic | 5060 | Up |
| Home 120/8001 | 164.120.12.18 | NAT | Dynamic | 5060 | Up |
| +17035551234 | 164.120.12.18 | NAT | Dynamic | 5060 | Up |
| +19725551234 | sbc1.compx.com | NAT | Dynamic | 5060 | Up |
| Home 130/ +19725551234 | sbc1.compx.com | NAT | Dynamic | 5060 | Up |

TABLE 2

ANG IP Routing Table (Home 110)

| Network Destination | Netmask | Gateway | Interface | Metric |
|---|---|---|---|---|
| 10.11.10.0 | 255.255.255.0 | 10.11.10.1 | LAN | 1 |
| 164.21.20.0 | 255.255.255.248 | 164.21.20.2 | WAN | 1 |
| 0.0.0.0 | 0.0.0.0 | 164.21.20.1 | WAN | 1 |

TABLE 3

ANG IP Interface Table (Home 110)

| Interface | Address | Netmask | VLAN ID |
|---|---|---|---|
| LAN1 | 10.11.10.1 | 255.255.255.0 | LAN |
| WAN | 164.21.20.2 | 255.255.255.248 | WAN |

TABLE 4

Example of a Host Table

| Address | Hostname |
|---|---|
| 164.21.20.2 | Home1.compx.com |
| 164.10.23.22 | Sbc1.compx.com |
| 164.10.23.21 | Mcs1.compx.com |

TABLE 5

Example of Peer Route Table

| Peer | Host | Port | Type | P2P Channel ID | Status |
|---|---|---|---|---|---|
| Home2@compx.com | 164.120.12.18 | 9100 | Public | 1 | UP |
| Home4@compx.com | 164.20.35.3 | 9100 | Public | 2 | Up |
| Home5@compx.com | 165.20.19.33/ 192.168.0.1 | 9100 | NAT | 3 | Up |
| Home6@compx.com | | | | | Down |

Tables 5 illustrates a peer routing table for the home 110 that was completed via the peer to peer communications channel as previously described with reference to FIG. 7. The table illustrates that there are four (4) known peers to the ANG 112 of the home 110, Home2 (home 120), Home 4 (home 140), Home5 (not shown) and Home6 (not shown). The home 120 has a public IP address and is therefore reachable directly on the public internet. The port used to connect to the home 120 is port 9100. In one aspect, each peer ANG that is reachable will be assigned a unique P2P channel ID in order to differentiate it from the other active peers. For example, the communications channel used to communicate with home 120 is designated as P2P channel 1. The status indicator shows that the remote ANG at the home 120 (e.g., the ANG 122) is up and functional. The entry for the home 140 is similar to the home 120. Home5 (not shown), is similar to the home 120 and the home 140, except that it is located behind a firewall as opposed to connecting directly to the internet via a public IP address. This is depicted by the IP address entry in the table, which lists both the public IP address, which is the public IP address of the firewall in this case, and the private network (WAN) address of the ANG of Home5. This way the ANG 112 of the home 110 can reach the Home5 ANG's public IP address, which is managed by the firewall, and the firewall will map the connection through to the translated (NAT) private IP address of the Home5 ANG. In order for certain services to communicate at the application level, it may be necessary for the ANGs to be aware of any applicable private IP addresses of each ANG so that they could carry out the necessary IP address mappings at the application level.

Figure 13:
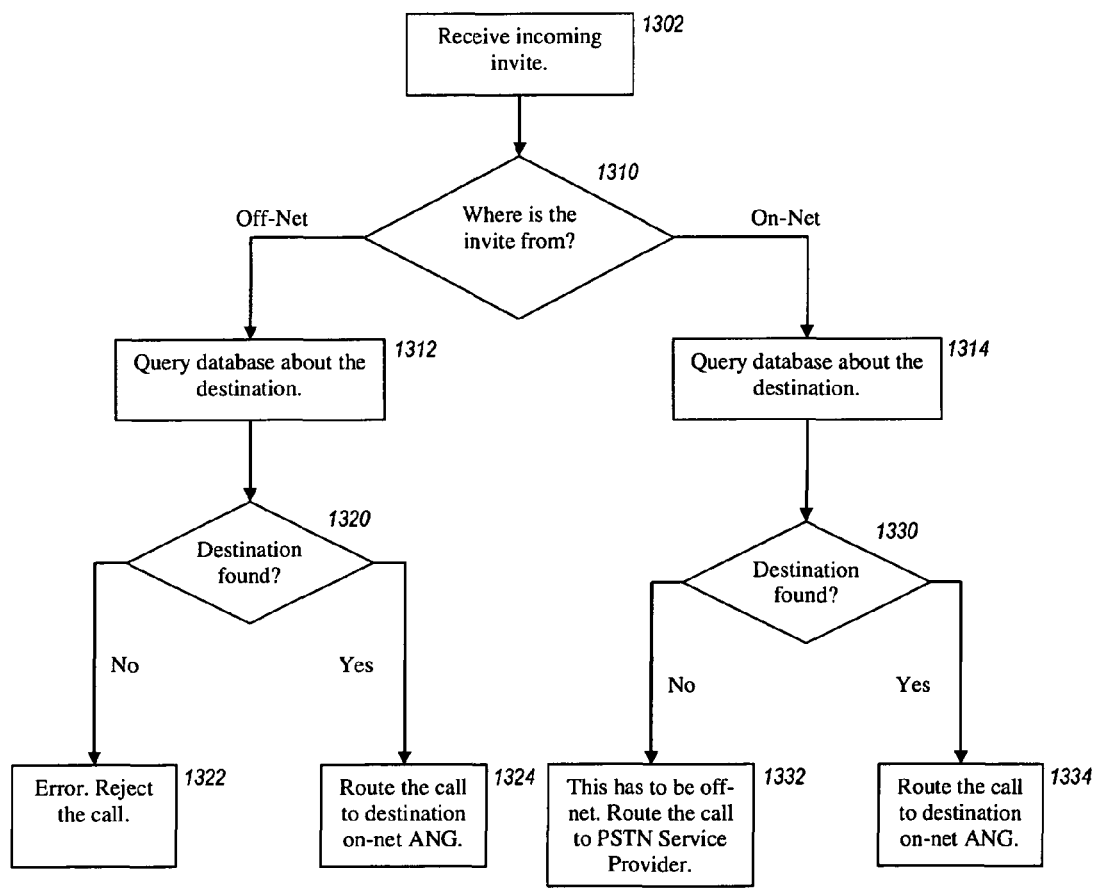
FIG. 13 is a routing logic diagram of a session redirect server (SRS).

FIG. 13 is a flow diagram illustrating the operation of an SRS for an invitation handling process 1300, where in step 1302, the SRS receives the incoming invitation and determines if the invitation comes from an Off-Net or On-Net source. If the invitation is from an Off-Net source, then operation continues with step 1312, where the database is queried and it is determined in step 1320 if the destination is found in the database. If the destination is not found, then operation continues with step 1322, where the call is rejected because there is an error in the invitation. If the destination is found in step 1320, then operation continues with step 1324, where the call is routed to the destination On-Net ANG. Returning to step 1310, where it is determined if the invitation is from an Off-Net or On-Net source, if the destination is from the On-Net source, then operation will continue with step 1314, where the database will be queried for the destination contained in the invitation. If the destination is not found, as determined in step 1314, then operation will continue with step 1332, where the call has to be routed to a PSTN service provider as the call is an Off-Net call. If the destination is found in step 1330, then operation continues with step 1334, where the call is routed to an On-Net ANG.

Figure 14:
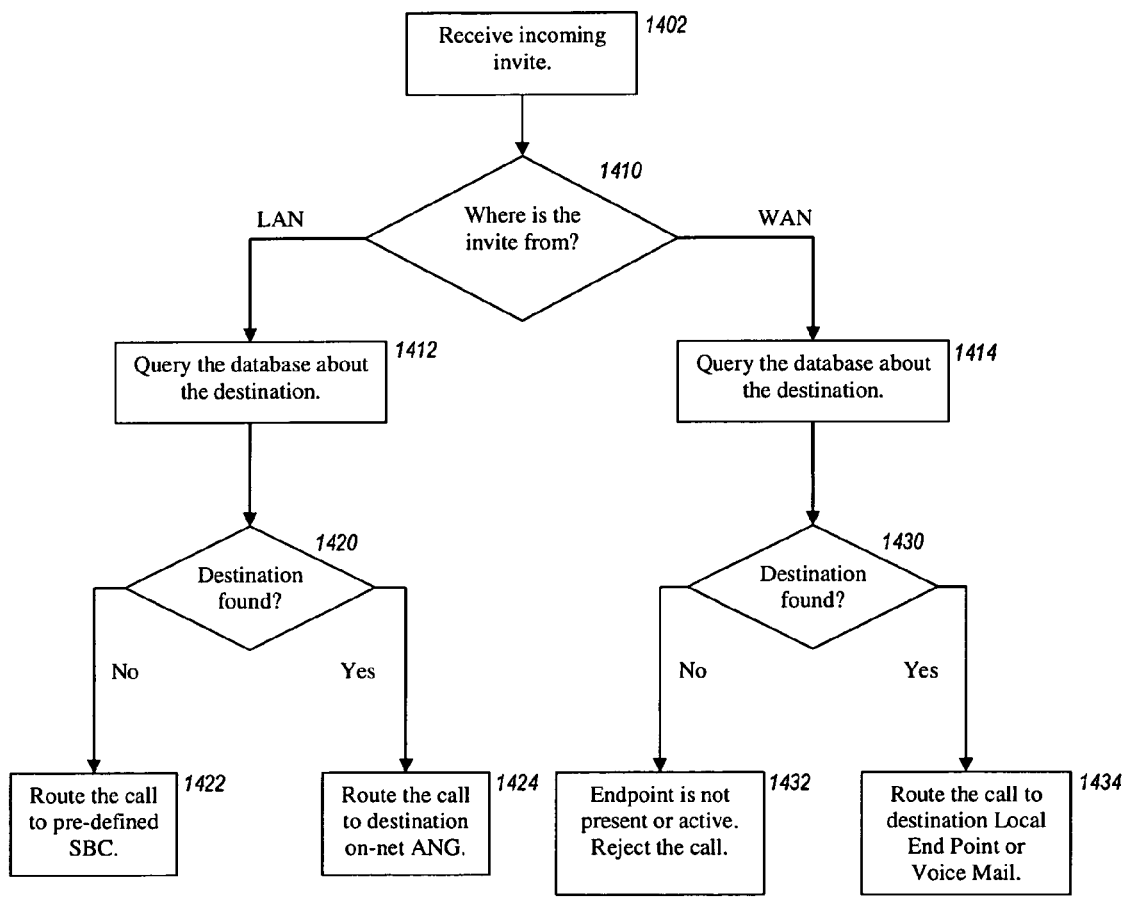
FIG. 14 is a routing logic diagram for an ANG.

FIG. 14 is a flow diagram illustrating the operation of an ANG for an incoming invitation process 1400, where in step 1402, the ANG receives an incoming invitation. Initially, the ANG will determine from where the invitation comes in step 1410. If the invitation comes from the LAN interface, then operation will continue with step 1412, where the ANG will query a database about the destination of the invitation. If the destination is not found, as determined in step 1420, then operation continues with step 1422, where the call is routed to a pre-defined SBC. If the destination is found, as determined in step 1420, then the call is routed to the On-Net ANG specified in the invitation in step 1424. Returning to step 1410, if it is determined that the invitation comes from the WAN interface, operation will continue with step 1414, where the database is queried about the destination and, if the destination is not found, as determined in step 1430, then operation continues with step 1432. In step 1432, the endpoint device is not active or the endpoint device is not present, so the call is going to be rejected. If the entry does exist in the database as determined in step 1430, then operation continues with step 1434, where the call is routed to the destination local endpoint device or to voicemail if no one is available to answer the call.

As noted earlier, the ANG may be implemented using a variety of different hardware and software components and may communicate with various implementations of the ASP. However, it may be helpful to discuss a specific implementation by way of example, particularly one configured in accord with the new paradigm for managed application service delivery as discussed above relative to FIG. 2. For that purpose, FIG. 2 provides a high-level depiction of the logical architecture of the software and hardware of a multi-services applications gateway device (e.g., ANG), together with a network service provider termination apparatus for broadband connection to a wide area network.

Figure 15:
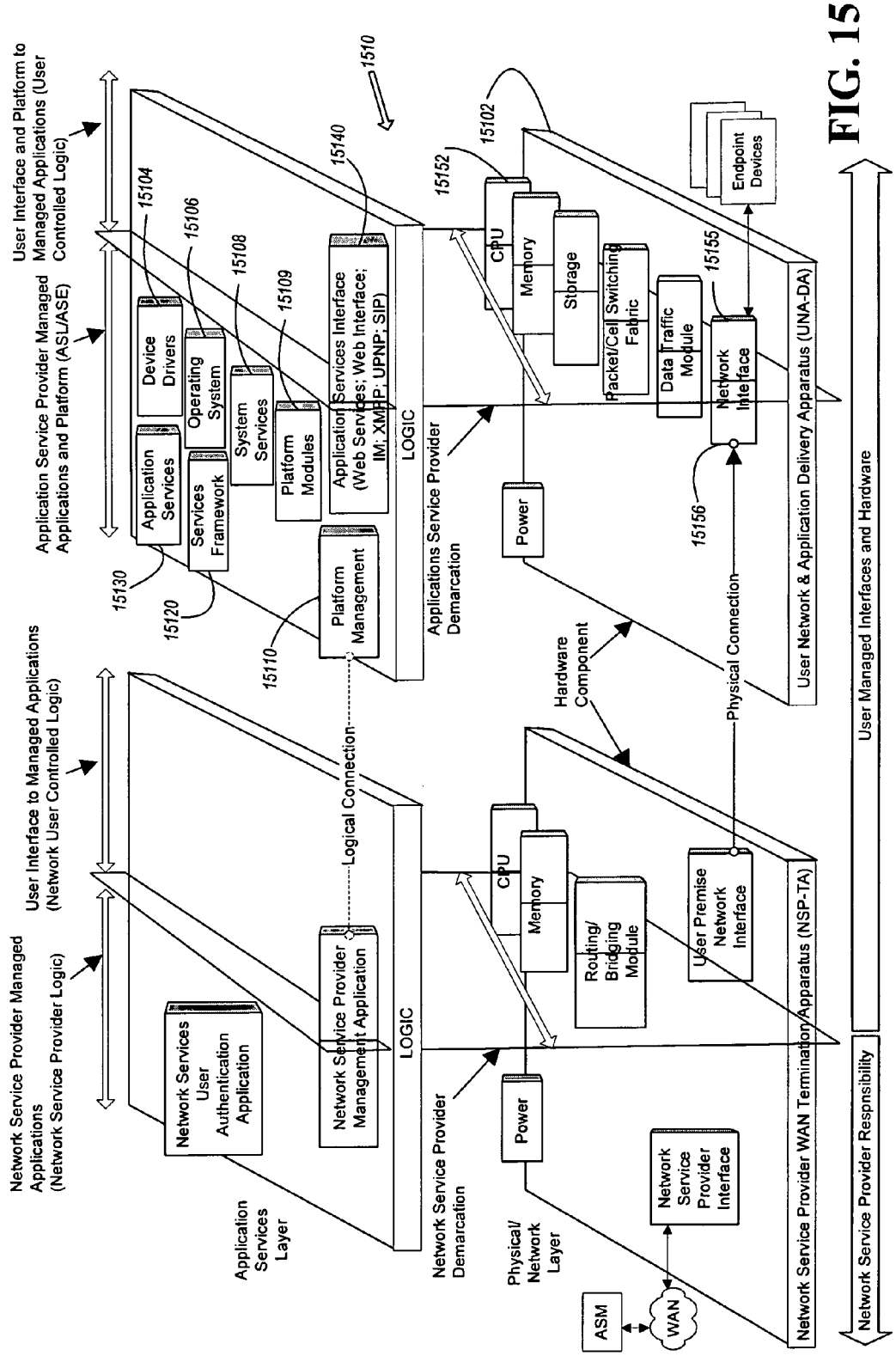
FIG. 15 is a high-level depiction of the logical architecture of the software and hardware of a multi-services applications gateway device (e.g., ANG), together with a network service provider termination apparatus for broadband connection to a wide area network, and shows a first or Network Service Provider Demarcation at the network edge as well as a second demarcation between the Application Service Provider and the User.

FIG. 15 thus depicts the logical and physical elements as may be deployed at a user premises. At the Physical/Network layer shown therein, the drawing shows an example of user premises hardware components required for delivering data services (i.e. Internet connectivity) along with a separate, non-integrated managed hardware used in delivering a set of managed application services (e.g. IM, VOD, IP telephony). The Network Service Provider Wide Area Network Termination Apparatus (NSP-TA) allows for a typical termination of a Wide Area Network Services connection, such as DSL, Cable, Fiber, etc, by a network services provider. The NSP-TA provides the WAN Termination in the NI Layer (FIG. 2). The NSP-TA may be an existing user-premises device, provided by the carrier supplying network services to the premises. FIG. 15 also depicts the Network Service Provider Demarcation at the hardware level.

If configured as a standalone device, the NSP-TA device is required to have its own CPU, Memory, physical interfaces and logic control. In order for Network Service Providers to deliver managed services, they typically require a management element controlled by the CPU on the NSP-TA. To depict these logical elements residing on the hardware components, FIG. 15 includes a representation of the user premises Application Services Layer above the hardware layer. This layer corresponds to the AS Layer of FIG. 2, but without reference to any logical elements residing at the network services provider. The management element, represented by the Network Service Provider Managed Application, allows the network service provider to determine the status of the network hardware device and interfaces as well as maintain a certain degree of security enforcement at the customer premises.

As noted, the network service functionality is at the NI and NF Layers and generally does not extend to the AS Layer(s) beyond basic authentication, authorization and state management. As with the hardware components, the logical elements also have a Network Service Provider Demarcation as shown in FIG. 15. On the WAN side, depicted as the Network Service Provider Managed Applications side, of the Network Service Provider Demarcation, resides the applications that are managed, and under the exclusive control, of the network service provider (the Network Service Provider Logic). The User Interface to Managed Applications is present on the LAN side of the Network Service Provider Demarcation within the Application Services Layer. Within this interface resides programming and logic available to users other than the network service provider referred to as the Network User Controlled Logic. The Network User Controlled Logic, which is depicted at the Application Services Layer in FIG. 15, provides a user interface to the Network Service Provider Logic and, to the extent permitted by the Network Service Provider Logic, interaction with or communication between the user and network service provider through the Network User Controlled Logic and the Network Service Provider Logic, and to the NSP-TA hardware components. The Network User Controlled Logic allows for the User of the hardware to make certain, minimal programming changes relevant to their preferences (e.g., user name and password changes, local IP addresses changes, local interface selection). All user devices typically can only communicate with the NSP-TA through one or more of the User Premises Network Interfaces. The user can modify the Network User Controlled Logic through the User Premises Network Interface. The Network Service Provider Demarcation is typically within the NSP-TA, logically dividing the Network Service Provider Interface and the User Premises Network Interface modules. The network service provider does not have any in-depth visibility or significant responsibility beyond the Network Service Provider Demarcation.

In the example, the User Network and Application Delivery Apparatus (UNA-DA), shown on the right hand side of FIG. 15, is a separate managed gateway device 1410 that a managed-service provider (which may be different than the network service provider) would control in delivering a set of application services to the user premises. The gateway device 1410 can be used to implement an ANG such as those discussed above. This device has its own dedicated CPU, memory, logic control, as well as its own dedicated set of interfaces. The UNA-DA includes one or more Network Interfaces providing connectivity to the NSP-TA as well as to user premises endpoint devices. The interfaces provide the LAN Termination functionality at the NI Layer (FIG. 2). One skilled in the art will readily recognize, however, that the physical connection that connects the UNA-DA to the NSP-TA also provides connectivity for the UNA-DA to the public (WAN side) network, and is the means by which the UNA-DA accesses the public network. The endpoint devices connected to the LAN Interface are on the private (LAN) side of that interface. The UNA-DA also includes a switch, router or bridge for the NF Layer.

Programming elements of the UNA-DA in the gateway device 1510 are depicted at the Application Services Layer of the UNA-DA. Certain logical elements, depicted as the Application Service Provider Managed Applications and Platform in FIG. 15, on which resides, inter alia, the programming corresponding to the ASL and ASE of FIG. 2, are managed by the managed application service provider's network control center, e.g. by the ASM through a wide area network (WAN) by means of a control channel to the Application Service Provider Managed Applications and Platform. The Application Service Provider Managed Applications and Platform includes a platform management logic module that, with other programming in the Platform and the ASM, allows the managed application service provider to control the hardware elements of the UNA-DA in addition to any other relevant application services logic or hardware that may reside on the user premises. For example, this programming enables a managed application service provider to control and manage the hardware elements on the UNA-DA to ensure proper use and allocation of the UNA-DA's processing, memory, storage, and bandwidth, to monitor local hardware security and generate needed alarms or protection sequences, and to prioritize applications based on a set of established policies. The user would have control over specific parameters of application services obtained through the UNA-DA, through the User Interface and Platform to Managed Applications (User Controlled Logic) shown in FIG. 15. These parameters allow the user to control the local behavior of the interfaces and to configure the specific applications to accommodate the user network as configured by the user and to implement the user preferences for those applications.

Hence, FIG. 15 illustrates the logical architecture of the software and hardware of the UNA-DA in the form of a multi-services applications gateway device 1510, together with a network service provider termination apparatus for broadband connection to a wide area network in this case implemented by the NSP-TA. The gateway device 1510 is an application delivery apparatus, for delivering application services to endpoint devices using network layer communications through the network termination apparatus and the wide area network. The drawing also illustrates relevant demarcations between functionalities of the gateway device and termination, which delineate control/management access. The arrangement of the ASL and ASE logic between the two demarcations and the attendant logical demarcations in management access to the hardware resources at the premises result in significant management control by the application service provider and relieve the user of significant burdens in arranging and configuring the systems/services at the premises. Hence, we will consider the demarcations and the resulting relationships to the provider and the user at the various layers, in more detail.

As outlined above, the logical Network Service Provider Demarcation is formed at the edge of the wide area network (WAN) at the user premises, that is to say between the WAN and the equipment in the user premises. The arrows at the bottom of FIG. 15 show that the area covered to the LEFT of the Network Service Provider Demarcation (as depicted by the lower arrow on the left of vertical plane) is the Network Service Providers responsibility. From the perspective of a network service provider, anything to the RIGHT of that first demarcation (as depicted by the lower arrow on the right of the vertical plane) normally would be the customer's responsibility. As shown, this separation at the first demarcation includes delineation among the hardware elements for the NSP-TA.

As shown in FIG. 15, the application services layer also defines an Application Service Provider Demarcation, which extends through the hardware modules on the "Hardware Components" plane as well as the programming in the logical application services plane. In this way, the drawing depicts those modules that are under the responsibility of Application Service Provider (as depicted by the top middle bi-directional arrow). On the logic plane, the user can interact with the managed services through the Application Services Interface function 15140, and the Application Service Provider can interact with the Network Service Provider's managed Applications through the Network Service Provider Managed Application function. This is an optional function but it helps show how the UNA-DA can interface with Network devices from a network services provider, and provide a unified application interface to both hardware elements (NSA-TA, UNA-DA). This management relationship is represented by a dotted line on the logic layer between the Platform Management Logic module 15110 and the network service provider management application in the NSP-TA. In effect, the application service provider can "manage" the NSP-TA for the user, even though it is not the application service provider's hardware. In the case where the application service provider is a network service provider as well (the NSP-TA is the application service provider's own hardware), then it would work in practically the same way.

FIG. 15 also shows how the programming effectively partitions the hardware at the Application Service Provider Demarcation, which gives the application service provider the ability to provide a managed P2P private service that will enable that provider to use the UNA-DA for performing distributed computing, search, indexing, file backup, sharing, etc., all managed and controlled by the provider's service management center.

The arrows at the top of FIG. 15 thus show the delineations in management responsibility created by the two logical demarcations. As at the bottom, the area covered to the LEFT of the Network Service Provider Demarcation (as depicted by the upper arrow on the left of first vertical plane) is the Network Service Provider's responsibility. Anything to the RIGHT of that second demarcation plane (as depicted by the upper arrow on the right of the second vertical plane) would be the customer's responsibility. However, the logic and hardware in the NSP-TA between the two vertical planes (as depicted by the upper arrow on the left of second vertical plane) is the Application Service Provider's responsibility. As noted above, a logical interface may be provided to the NSP-TA may enable the Application Service Provider's to assume the user's responsibility in managing the premises side of the NSP-TA as depicted by the upper arrow on the right of the first vertical plane.

To identify the separation of, and distinguish between, the programming and hardware components subject to control by the application service provider and those subject to control by the user premises, FIG. 15 identifies a dividing line across the logical elements of the UNA-DA, and a corresponding dividing line across hardware components, referred to as the Applications Service Provider Demarcation. The Applications Service Provider Demarcation is flexible in that it may extend logically through the Application Services Interface (and, in a hardware context, through the Network Interface) to other devices that are under the logical control of the Application Services Provider Managed Applications and Platform, given that "services" are not restricted to a specific hardware boundary.

There is no hard requirement for cross management between the UNDA-DA and the NSP-TA. Under this first scenario the user is responsible for making the configuration changes in the specific user controlled logic modules in order to get the two devices to communicate with each other. Optionally the two sub-systems can be combined together, either physically in one hardware device, or logically as two separate hardware devices, but having one managed interface.

Figure 19:
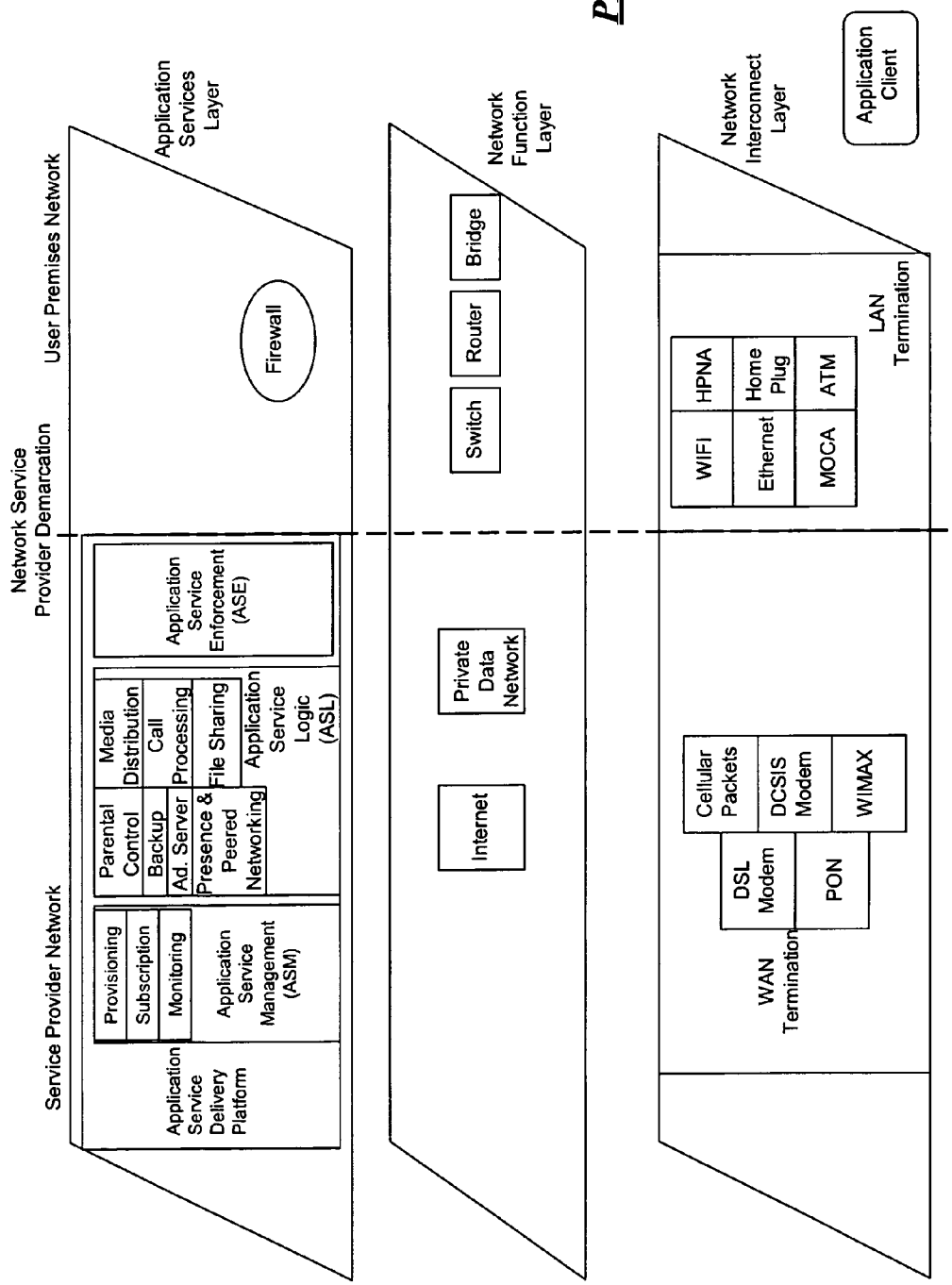
FIG. 19 is a layered logical block diagram of one possible configuration for service delivery to a client of an application within a user premises based on a typical current network architecture.
Figure 20:
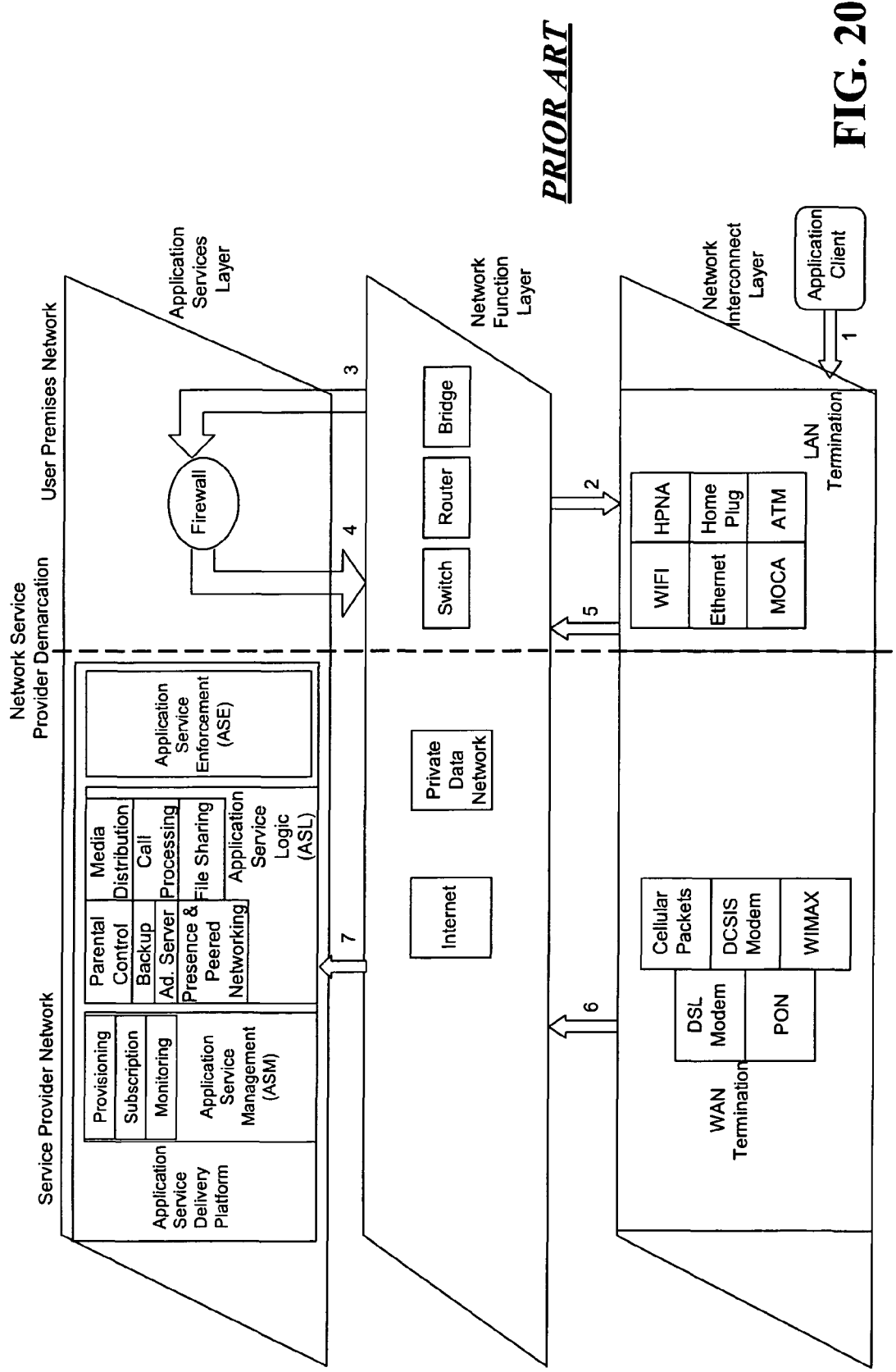
FIG. 20 is similar to FIG. 19, but overlaid with arrows to show a sample flow of logical steps taken by an Application Client to access a specific managed Application Services in the typical current network configuration.

As noted, the two hardware regimes described above (NSP-TA and the UNA-DA) may be combined into one managed hardware platform and, thereby, replace the need for the user to have access to the User Premises Network Interface with the logic residing in the Platform Management logic module of the Application Service Provider Managed Applications and Platform (compare to above-discussed FIG. 19). This would in effect replace the "user" access with a managed "machine" access, for aspects of the NSP-TA, as well as aspects of the application services offered through the UNA-DA. Thus, the combination creates an integral gateway device providing both network service and application services, under centralized management. Although integrated, network interconnect functions of the NSP-TA may still be managed by the network service provider, as in the example of FIG. 15. Those skilled in the art will readily see additional combinations and configurations for the hardware comprising the NSP-TA and the UNA-DA. For example, in a further embodiment, all the hardware dedicated to the Network Service Provider Interface may reside and be integral with the hardware comprising the UNA-DA. Thus, the hardware for the WAN interface may reside on the UNA-DA.

Figure 16:
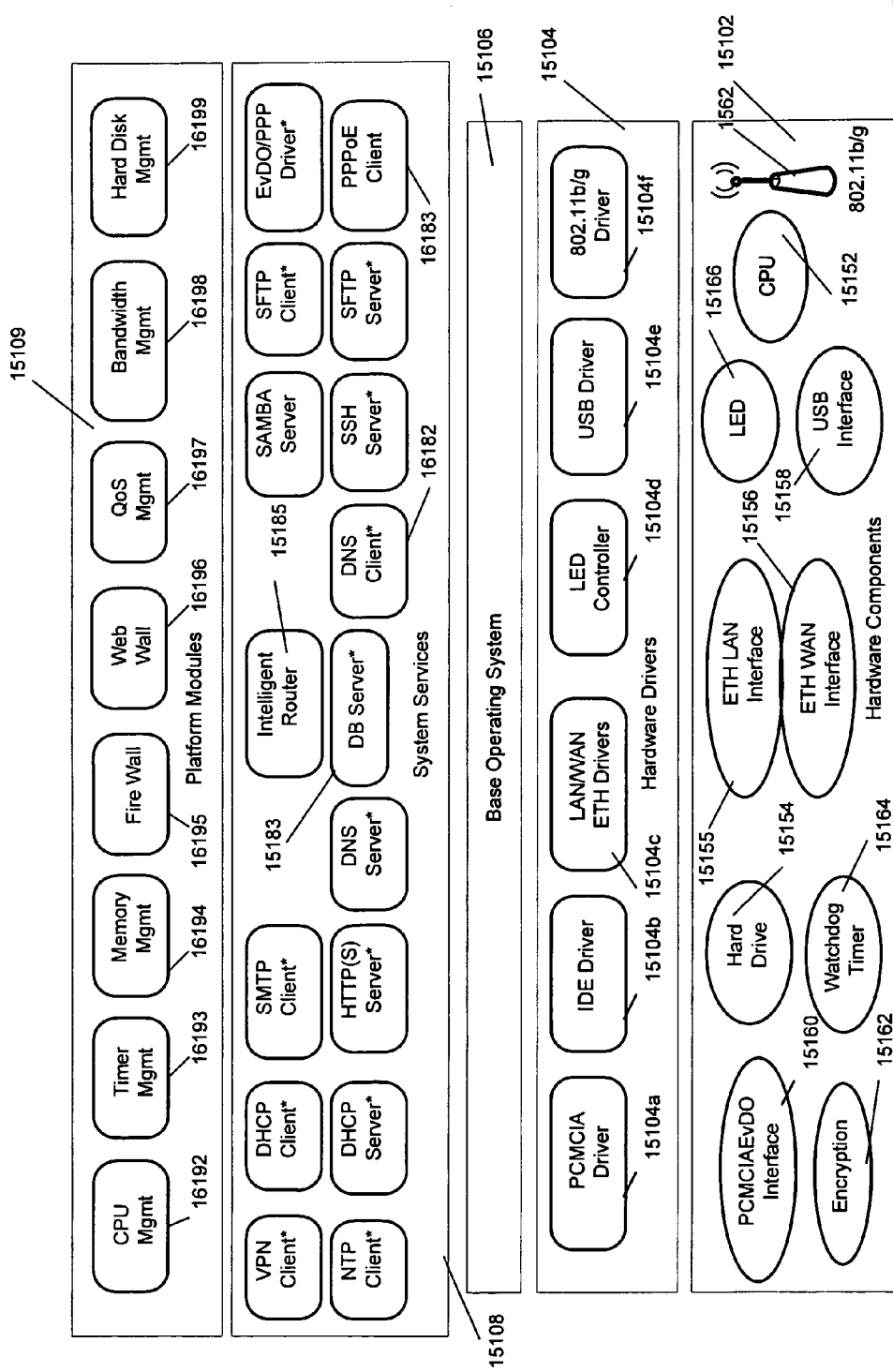
FIGS. 16, 17 and 18 depict the software and hardware architectures of the multi-services applications gateway device.
Figure 17:
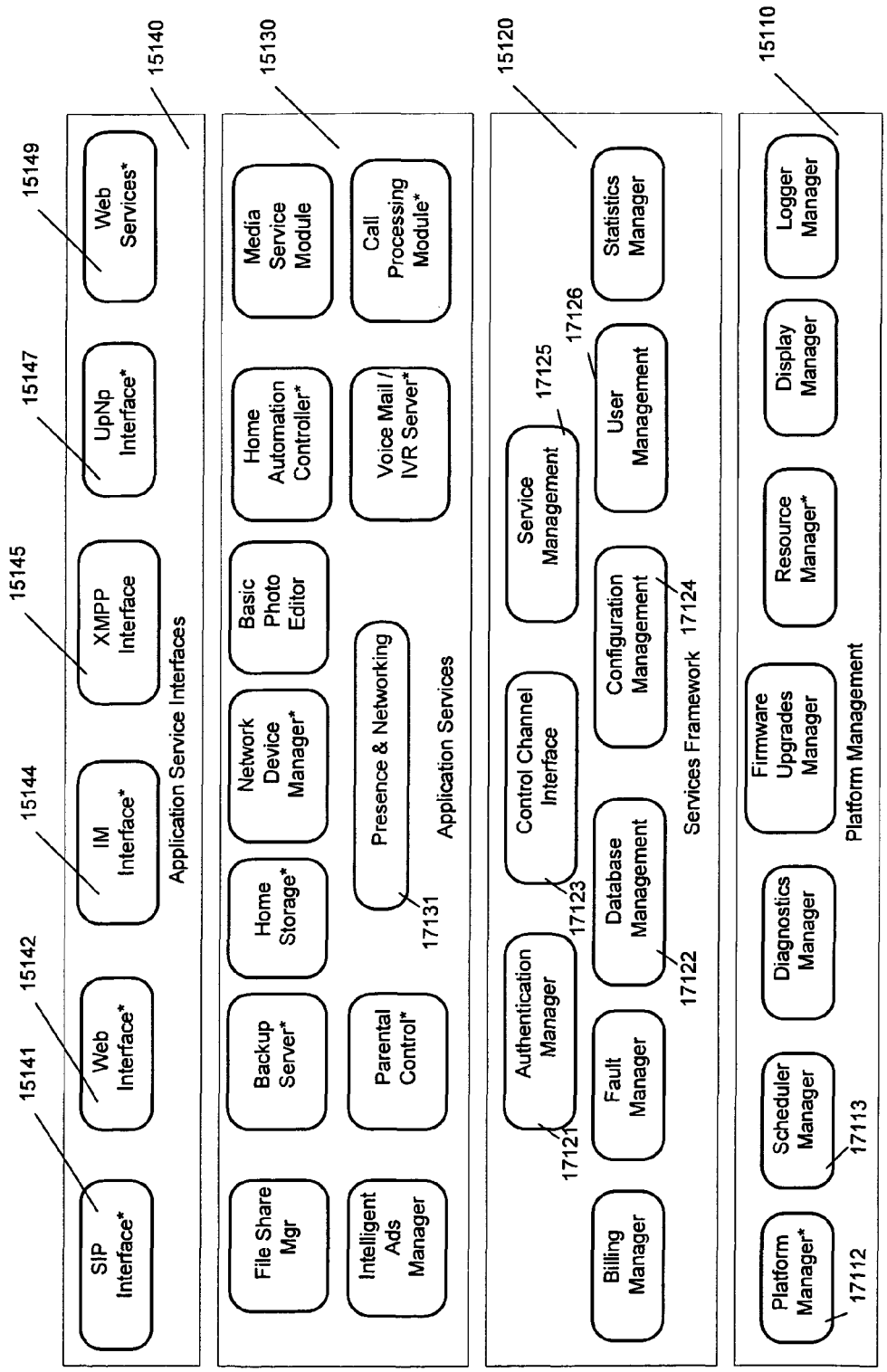

The composition of the premises gateway device 1510, earlier described with reference to FIG. 15, is now described in greater detail with reference to that drawing together with FIGS. 16-18. FIG. 15 illustrates the relationship of the demarcations to hardware and software of the gateway device 1510 and an associated NSP-TA device providing the wide area network termination at the user premises. As shown in FIGS. 16 and 17, the gateway device 1510 utilizes a layered architecture, which enables the encapsulation of similar functionality and the minimization of dependencies between functions in different layers. FIG. 16 shows the lower portion of the layered architecture, and FIG. 17 shows the upper portion of the layered architecture. The completed set of layers can be conceptualized as if FIG. 17 was combined with FIG. 16, with the layers of FIG. 17 above those of FIG. 16. FIGS. 15, 16 and 17 also depict exemplary functionality (hardware and logical) resident in each of the layers.

The layers include a hardware layer 15102, and device driver software 15104 for allowing the processor to operate other hardware elements of the gateway device 1510. FIG. 16C is a functional block diagram illustrating interconnection of exemplary elements of the hardware layer 15102.

The logical elements of the NI Layer residing on the gateway device 1510 are found in the Hardware Drivers 15104, which govern the operation of the Hardware Components 15102. The processor runs an operating system shown at layer 15106, which plays a role in each of the NI, NF, AS and Platform Management Layers (FIG. 2). The layered architecture 15100 also includes software for systems services 15108 and for the platform management layer shown at 15110 in this drawing. Logical elements represented by the NF Layer depicted in FIG. 2 are comprised of elements from the system services 15108. In a similar fashion, the Platform Management Layer depicted in FIG. 2 is implemented in the exemplary architecture of FIGS. 15, 16 and 17 by the platform modules 15109 and the platform management layer 15110.

Particular logical elements comprising the ASL and ASE functionalities of the AS Layer represented in FIG. 2, and that reside on the gateway device 1510 (predominately in the Application Service Provider Managed Applications and Platform of the UNA-DA shown in FIG. 15) are depicted in FIG. 17, and comprise logical elements from each of services framework 15120 and application services layer 15130. The layered architecture facilitates reuse or sharing of logic across the layers to provide a managed service framework 15120. The service management functionality provided by the framework 15120 enables deployment of new services as pluggable modules comprising computer readable instructions, data structures, program modules, objects, and other configuration data, in a plug and play fashion. The layered service architecture additionally provides the gateway device 1510 with intra-process communication and inter-process communication amongst the many services and modules in the service framework layer 15120 that enables the provisioning, management and execution of many applications and services, such as services in the Application Services layer 15130 at the gateway device 1510. Additionally provided are the application service interfaces 15140 that enable communications from user endpoint devices with service environments. In that regard, the interfaces 15140 enable the Application Service layer 15130 to act as an appropriate server with respect to client device application or service functionality of the endpoint devices. The application service interfaces 15140 also enable corresponding interfaces for the application services with aspects of service environments implemented outside the user premises. In that regard, the interfaces 15140 enable the Application Service layer 15130 to act as an appropriate client, for extending the application or service related communications to a server accessed via the wide area network 1599, such as a server of the service management center 1550. For example, the gateway device may appear as a SIP server to a SIP client in an endpoint device, e.g. for a VoIP telephone service; but the gateway device will appear as a SIP client with respect to some related functions provided by a server (such as a SIP directory server) provided by the service management center.

FIG. 15 thus depicts a high level service framework upon which are built services, e.g., downloaded via the service management center network and a wide area network as packages that are developed and offered by a service entity for customers. These services may be offered as a part of a default service package provisioned and configured at the gateway device 1510, or provisioned and configured subject to user subscription and may be added at any time as plug-in service modules in cooperation with the service management center, as discussed later. It is understood however, that while the gateway device 1510 includes much of the intelligence or service logic for providing various services, it is also possible that for some services, some or all of service logic may reside in the service management center network and/or with a third party provider.

As shown, the base support layer 15102 comprises hardware components including a processor device 15152, e.g. a system on chip central processing unit ("CPU") that includes processing elements, digital signal processor resources and memory. The CPU 15152 is also coupled to a random access memory or "RAM" (see FIG. 16C) and additionally, non-volatile hard drive/disk magnetic and/or optical disk memory storage 15154. Generally, the above-identified computer readable media provide non-volatile storage of computer readable instructions, data structures, program modules, objects, service configuration data and other data for use by the gateway device. The non-volatile hard drive/disk magnetic and/or optical disk memory storage 15154 may be partitioned into a network side which is the repository for storing all of the service logic and data associated with executing services subscribed to by the user, and, is invisible to the user, and, a user side for storing user generated content and applications in which the user has visibility. Although not shown, the CPU 15152 may be coupled to a microcontroller for controlling a display device.

Additional hardware components include one or more Ethernet LAN and WAN interface cards 15155, 15156 (e.g. 802.11, T1, T3, 56 kb, X.25, DSL or xDSL), which may include broadband connections (e.g. ISDN, Frame Relay, ATM, Gigabit Ethernet, Ethernet over SONET, etc.), wireless connections, or some combination of any or all of the above. The card 15155 referred to as the LAN interface card provides data communication connectivity within the user premises, essentially, for communication via a user premises network with any endpoint devices operating within the premises. The card 15156 referred to as the WAN interface card provides data communication connectivity for the gateway device 1510 and endpoint devices communicating through the device 1510, with the wide area IP network. For additional or alternative customer premises communications, the hardware components 15102 may also include one or more USB interfaces 15158; and for additional or alternative communications with the wide area network, the hardware components may also include the PCMCIA EvDO interface card 15160.

A data encryption/decryption unit 15162 is additionally provided as part of the architecture for providing data security features. A watchdog timer element or like timer reset element 15164 is provided as is one or more LED devices 15166 for indicating status and other usable information to users of the gateway device 1510.

The gateway device provides an in-premises footprint enabling the service connectivity and local management to client(s). The implementation of functions and the related control such as a router (with quality of service (QoS)), firewall, VoIP gateway, voice services and voice mail may be embodied and performed within the CPU 15152.

The discussion of the gateway hardware layer above and the illustration thereof in the drawings provides a high-level functional disclosure of an example of the hardware that may be used in the gateway device. Those skilled in the art will recognize that the gateway device may utilize other hardware platforms or configurations.

Continuing, as shown in FIG. 16, the device driver layer 15104 comprises a multitude of driver interfaces including but not limited to: a PCMCIA driver 15104*a*, for enabling low level communication between the gateway CPU 15152 and the PCMCIA network interface card wireless interface, an IDE driver 15104*b* for enabling low level communication between the gateway CPU 15152 and the local mass memory storage element, and LAN/WAN drivers 15104*c* for enabling low level communication between the gateway CPU 15152 and the respective network interface cards 15155 and 15156. The exemplary driver layer also includes an LED driver/controller 15104*d* for driving LED(s) 15166, a USB driver 15104*e* allowing CPU 15152 to communicate via USB interface 15158, and an 802.11b/g (or n) wireless network driver 15104*f* for allowing the CPU 15152 to communicate via the access point 1562. The drivers provide the logical connectivity between the low level hardware devices 15102 and the operating system 15106 which controls the execution of computer programs and provides scheduling, input-output control, file and data management, memory management, and communication control and related services for the gateway device. With respect to the operating system 15106, the gateway computing may support any embedded operating system, any real-time operating system, any open source operating system, any proprietary operating system, or even any operating systems for mobile computing devices as long as the operational needs of the client discussed herein below can be met. Exemplary operating systems that may be employed include Windows®, Macintosh®, Linux or UNIX or even an embedded Linux operating system. For instance, the gateway device 1510 may be advantageously provided with an embedded operating system 15106 that provides operating system functions such as multiple threads, first-in first-out or round robin scheduling, semaphores, mutexes, condition variables, message queues, etc.

Built upon the system operating system 15106 is a system services support layer 15108 providing both client-like and server-like functions that enable a wide range of functionality for the types of services capable of being managed by the gateway device 1510. For instance, there is provided a Dynamic Host Configuration Protocol (DHCP) client and server software modules. The DHCP client particularly requests via a UDP/IP (User Datagram Protocol/Internet Protocol (e.g. Ipv4, Ipv6, etc.) configured connection information such as the IP address that the gateway device 1510 has been dynamically assigned by a DHCP service (not shown), and/or any the subnet mask information, the gateway device should be using. The DHCP server dynamically assigns or allocates network IP addresses to subordinate client endpoints on a leased, e.g., timed basis. A Virtual Private Network (VPN) client may communicate via a proxy server in the service control network, according to a VPN protocol or some other tunneling or encapsulation protocol. An SMTP client handles incoming/outgoing email over TCP, in accordance with the Simple Mail Transfer protocol. A Network Time Protocol (NTP) (RFC 1305) generates and correlates timestamps for network events and generally provides time synchronization and distribution for the Internet. A Domain Name Server (DNS) client and server combination are used by the IP stack to resolve fully-qualified host or symbolic names, i.e. mapping host names to IP addresses.

An HTTP(S) server handles secure Hypertext Transfer Protocol (HTTP) (Secure Sockets Layer) communications and provides a set of rules for exchanges between a browser client and a server over TCP. It provides for the transfer of information such as hypertext and hypermedia, and for the recognition of file types. HTTP provides stateless transactions between the client and server.

A Secure File Transfer Protocol (SFTP) client and server combination govern the ability for file transfer over TCP. A SAMBA server is an open source program providing Common Internet Files Services (CIFS) including, but not limited to file and print services, authentication and authorization, name resolution, and service announcement (browsing). An EvDO/PPP driver includes a Point-to-Point Protocol (PPP) daemon configuration for wireless broadband services. A PPPoE (Point-to-Point Protocol over Ethernet) client combines the Point-to-Point Protocol (PPP), commonly used in dialup connections, with the Ethernet protocol; and it supports and provides authentication and management of multiple broadband subscribers in a local area network without any special support required from either the telephone company or an Internet service provider (ISP). The gateway device 1510 is thus adapted for connecting multiple computer users on an Ethernet local area network to a remote site through the gateway and can be used to enable all users of an office or home to share a common Digital Subscriber Line (DSL), cable modem, or wireless connection to the Internet. A Secure Shell or SSH server implemented with HTTP protocol provides network protocol functionality adapted for establishing a secure channel between a local and a remote computer and encrypts traffic between secure devices by using public-key cryptography to authenticate the remote computer and (optionally) to allow the remote computer to authenticate the user.

Additionally provided as part of the system services layer 15108 is intelligent routing capability provided by an intelligent router device 15185 that provides Quality of Service (QoS, guaranteed bandwidth) intelligent routing services, for example, by enforcing routing protocol rules and supporting unlimited multiple input sources and unlimited multiple destinations and, particularly, for routing communications to networked digital endpoint devices subordinate to the gateway. A central database server 15183 handles all of the database aspects of the system. For example, the database server 15183 maintains and updates registries and status of connected digital endpoint devices, maintains and updates service configuration data, services specific data (e.g. indexes of backed-up files, other service specific indexes, metadata related to media services, etc.) and firmware configurations for the devices. The database server 15183 may also store billing and transaction detail records and performance diagnostics. The database server logic 15183 also satisfies all other database storage needs as will be described in greater detail herein.

Referring back to FIGS. 15 and 16, built on top of the system services layer 15108 is the platform module layer 15109. The platform module layer 15109 provides a software framework for operating system and communications level platform functionality such as CPU management; Timer management; memory management functions; a firewall; a web wall for providing seamless WWW access over visual displays via access technologies enumerated herein, e.g. HTTP, SMS (Short Messaging Service) and WAP (Wireless Access Protocol); QoS management features, bandwidth management features, and, hard disk drive management features. The layered architecture further provides a platform management layer 15110 as shown in FIG. 17, which together with the platform modules 15109 implement the platform management layer/logic discussed earlier (with regard to FIG. 2). In the layered architecture, the platform management layer 15110 (and elements shown above it in FIG. 17) is built upon the platform modules 15109.

The features/functions in the layer 15110 include a platform manager module which will implement unique rules based notification services. On operational failure, for example, when one of the components or services fails, the platform manager would detect this failure and take appropriate action such as implement a sequence of rules to provide notification to a user. A scheduler module manages scheduled device maintenance, managing scheduled services, e.g., back-up services, etc. The layer 15110 also includes a diagnostics module and a firmware upgrades management module for managing firmware upgrades. A resource management module manages system resources and digital contention amongst the various resources, e.g. CPU/Bandwidth utilization, etc. A display management module and a logger management module store and track gateway log-in activity of users and applications, e.g., voice call logs, at the user premises. The platform management layer 15110 in concert with resource and service management components enforces the separation of network side managed service control and user side delegations depending upon service subscriptions and configurations. For example, the platform and resource management encompass rules and guidelines provided according to subscribed services that act to enforce, manage and control input/output operations, and use of hard drives space etc. A demarcation point, logically depicted as the Application Service Provider Demarcation in FIG. 15, is thus defined that provides a hard line between what is "owned by" the customer and what is "owned by" the application service provider.

The logical platform management layer 15110 allows for inter-layer allocation of local resources. This function guarantees access between the application service/management logic implemented at the higher layers in the gateway device 1510 and the applications service management function in the service management center, by assuring that the local user premises hardware and software modules are functioning at a required state (CPU and memory usage, bandwidth usage, QoS settings, etc.). The platform manager is also responsible for implementing that part of the managed application services to be performed by the gateway device. In that regard, the platform manager secures and manages the overall hardware platform, given that in this scenario, the network function layer and the application service layer reside on one hardware platform. This secure hardware platform provides a robust and secure operating environment for the application services layer. So, to establish a secure and robust hardware operating environment, the platform management layer must interface with all the layers above it and allow for bi-directional management information flow among all of the functions.

Referring back to FIGS. 15 and 17, built on top of the platform management layer 15110 is the Services Framework 15120, which provides a library of application support service processes that facilitate data collection and data distribution to and from the multimedia endpoint devices. The application support service processes include, but are not limited to: an authentication manager for use in authenticating devices connected to the gateway device; a billing manager for collecting and formatting service records and service usage by endpoint devices, e.g. calls, back-up services etc.; a fault manager for detecting and managing determined system and/or service faults that are monitored and used for performance monitoring and diagnostics; a database manager; a control channel interface via which the gateway initiates secure communications with the operations support infrastructure; a configuration manager for tracking and maintaining device configuration; a user manager; a service manager for managing service configuration and firmware versions for subscribed services provided at the gateway device; and a statistics manager for collecting and formatting features associated with the gateway device. Statistics may relate to use of one or more services and associated time-stamped events that are tracked.

Built on top of the Services Framework layer 15120 is the Application Services layer 15130 providing library of user application services and application support threads including, but not limited to: file sharing functionality; backup services functionality; home storage functionality; network device management functionality; photo editing functionality; home automation functionality; media services functionality; call processing functionality; voice mail and interactive voice response functionality; presence and networking functionality; parental control functionality; and intelligent ads management functionality. The multi-services applications gateway 1510 further provides application service interfaces 15140 that are used to enable a variety of user applications and communications modalities.

For instance, the SIP Interface 15141 is an interface to the generic transactional model defined by the Session Initiation Protocol (SIP) that provides a standard for initiating, modifying or terminating interactive user sessions that involve one or more multimedia elements that can include voice, video, instant messaging, online games, etc., by providing access to dialog functionality from the transaction interface. For instance a SIP signaling interface enables connection to a SIP network that is served by a SIP directory server via a Session Border Controller element in the service management center.

The Web Interface 15142 enables HTTP interactions (requests and responses) between two applications. The Web services interface 15149 provides the access interface and manages authentication as multi-services gateway devices access the service management center via web services. The IM Interface 15144 is a client that enables the multi-services gateway device 1510 to connect to one or more specific IM network(s). As further shown in FIG. 17, the UpNp (Universal Plug and Play) interface enables connectivity to other stand-alone devices and PCs from many different vendors.

The XMPP interface 15145 is provided to implement the protocol for streaming (XML) elements via the gateway device 1510, in order to exchange messages and presence information in close to real time, e.g. between two gateway devices. The core features of XMPP provide the building blocks for many types of near-real-time applications, which may be layered as application services on top of the base TCP/IP transport protocol layers by sending application-specific data qualified by particular XML namespaces. In the example, the XMPP interface 15145 provides the basic functionality expected of an instant messaging (IM) and presence application that enable users to perform the following functions including, but not limited to: 1) Exchange messages with other users; 2) Exchange presence information with other devices; 3) Manage subscriptions to and from other users; 4) Manage items in a contact list (in XMPP this is called a "roster"); and 5) Block communications to or from specific other users by assigning and enforcing privileges to communicate and send or share content amongst users (buddies) and other devices.

Referring again to FIGS. 16 and 17, the components that are involved in the table lookup and logic processing for the rapid establishment of the call session are the presence and networking component 15132 in Application Services layer 15130 of FIG. 17 and the intelligent router device 15185 of FIG. 16. The presence and networking component 15132 provides the network addresses of far end gateway and network devices and these addresses are stored via the intelligent routing device 15185. The intelligent routing device 15185 performs the table lookup and provides the routing information to the other application services components in application services layer 15130, as requested from the particular application services component, such as the call processing module 15134 found in application services layer 15130.

The components needed to implement to function from the hardware layer 15102 includes the hard drive 15154 or persistent memory device (flash drive), which holds the executable program that will run on the local device. The CPU 15152 will load the executable files from this location for execution. The hard drive 15154 will also be used for storing routing data, user data, peer node data, logs, etc. The Ethernet WAN interface 15156 is used to establish a data connection with the Service Center, over the Wide Area Network. The Ethernet WAN interface 15156 is also used to establish connections to the peers over the Wide Area Network. The CPU 15152 allows for the control of the hardware modules and the communication with the modules by the hardware driver modules and it runs the operating system that supports the application services that supports all the functions carried out by the other modules and services.

From the hardware layer 15104, the drivers needed include the IDE driver 15104*b* (or SATA driver), which is used to allow communications between the operating system and the hard drive, and the LAN/WAN Ethernet drivers 15104*c* is used to allow for communications between the operating system and the Ethernet switch or physical ports.

From the system services layer 15108, the system services used include the database server 15183, which is used to store the IP routes, peer lists, and contact lists; the 15185 intelligent router, which provides all standard IP routing functionality for the ANG; a DNS client 16182, which allows the ANG to locate the Application Service Provider gateways, by resolving domain names to IP addresses. It gets the IP addresses from the DNS servers that reside on the public/private IP network.

This PPPoE client 16183 is used to establish a point to point connection to the public/private IP network service provider. This may not be needed if the WAN connection is not PPP based (such as the cable modem).

All the modules in the platform modules layer 15109 are used to manage the different components of the ANG. A CPU management module 16192 ensures that the CPU 15152 is functioning properly and is allocating resources to individual services appropriately; a timer management module 16193 makes sure that the system time is accurate and also provides timing to other sub-components; a memory management module 16194 makes sure that the RAM is used only by the correct applications and that each application is utilizing the RAM in the manner that it was designed for; a Firewall module 16195 provides Network level security; a web wall 16196 provides application level security; a QoS management 16197 assures that the right service types are given the appropriate priority for bandwidth usage; a bandwidth manager 16198 makes sure that specific applications/packets have the correct amount of bandwidth on the LAN and WAN interfaces; a hard disk management module 16199 makes sure the hard disk is functioning properly and performs necessary file and disk management.

Referring to FIG. 17, the platform management layer 15110 includes a platform manager 17192, which is responsible for making sure all of the system processes are running and operational; and a resource manager 17193 is used by making sure that all services have sufficient CPU/Memory/etc. as well makes sure that networks ports are open and available for the services to carry out their communications.

The service framework layer 15120 includes the authentication manager 17121 makes sure that the ANG is able to authenticate with the Application Service Provider systems in a secure manner; and a database management framework 17122, which provides data management capabilities for the various services. The database management framework 17122 also manages the databases on the ANG. The Presence and Networking Service uses the database management facilities 17122 to store, update and maintain the routing information downloaded from the Application Service Provider. The service framework layer 15120 also includes a control channel interface 17123 establishes the management channel between the ANG and the Application Services Provider and makes sure the session stays up as required; and a configuration management framework 17124 manages the ANG's system configurations and profiles as well as the configuration information for all the existing applications on the ANG. The configuration management framework 17124 also allows for the configuration of application settings on the ANG; the service management module 17125 manages all of the different services that are running on the ANG, including the Presence and Networking Service, which is one service that is used which is under the management of the service management module 17125. This module is also responsible for managing the Control Channel Interface that establishes the persistent communications channel with the Application Service Provider. It also manages the control, configuration and other information exchange from the Application Service Provider and other modules. The user management module 17126 manages the list of the local users of the ANG as well as the list of all of its peers that it is associated with.

The application services layer 15130 includes a presence and networking module 17131 is responsible for getting the routing information from the Application Service Provider over the persistent communications channel. It manages the routing information and makes the routes to peers available for other services.

The application service interfaces 15140 includes an XMPP interface 15145, which is an example of a protocol interface that the Presence and Networking module will use to establish a control channel with the Application Service Provider.

An example of the process by which all of these modules are used in routing multimedia sessions in a rapid manner is as follows. The ANG, residing at a premise is comprised of certain hardware components which it will need to have in order to establish a network and communications session with an Application Service Provider. An example of the hardware components are a Hard Drive/Persistent Storage to house the operating system, hardware drivers, and executable programs that will run on a CPU, as well as an Ethernet WAN interface to allow for the data connection for the executed applications, to communicate with the Application Service Provider. In order for the CPU to communicate with the hardware components, it must load the necessary hardware drivers (IDE/STA Driver, LAN/WAN Ethernet Driver, etc), and then the operating system to manage these interfaces and load the applications and services that it needs to execute. The set of system services that this application will need to operate are the intelligent router service, the Data Base Server, and the DNS client. The Platform modules must be executed to get all of the necessary "house keeping" functions operational, so that the system can operate reliably. The Resource Manager will then make sure that all of the services and applications will have the necessary system facilities they need in order to conduct their specific operations successfully (such has having a specific TCP port available to them). Once the platform management systems are up, the services that need to be activated are the Authentication Manager, the Database Manager, the Control Channel Interface, the configuration manager, the service manager, and the user manager. These services allow for the ANG to have the necessary functions to begin the process of establishing a connection with Application Service Provider. The service manager instructs the control channel interface to establish the control channel with the application service provider. The application that must then get loaded is the presence and networking service, which will utilize all of the services that were loaded before it to communicate over the control channel with the Application Service Provider. The presence and networking service uses a specific protocol, in this example XMPP as the messaging protocol over the persistent control channel. Once the control channel is established, all the necessary routing information is downloaded from the Application Service Provider to the ANG, which allows the ANG to have the required routing information.

Figure 18:
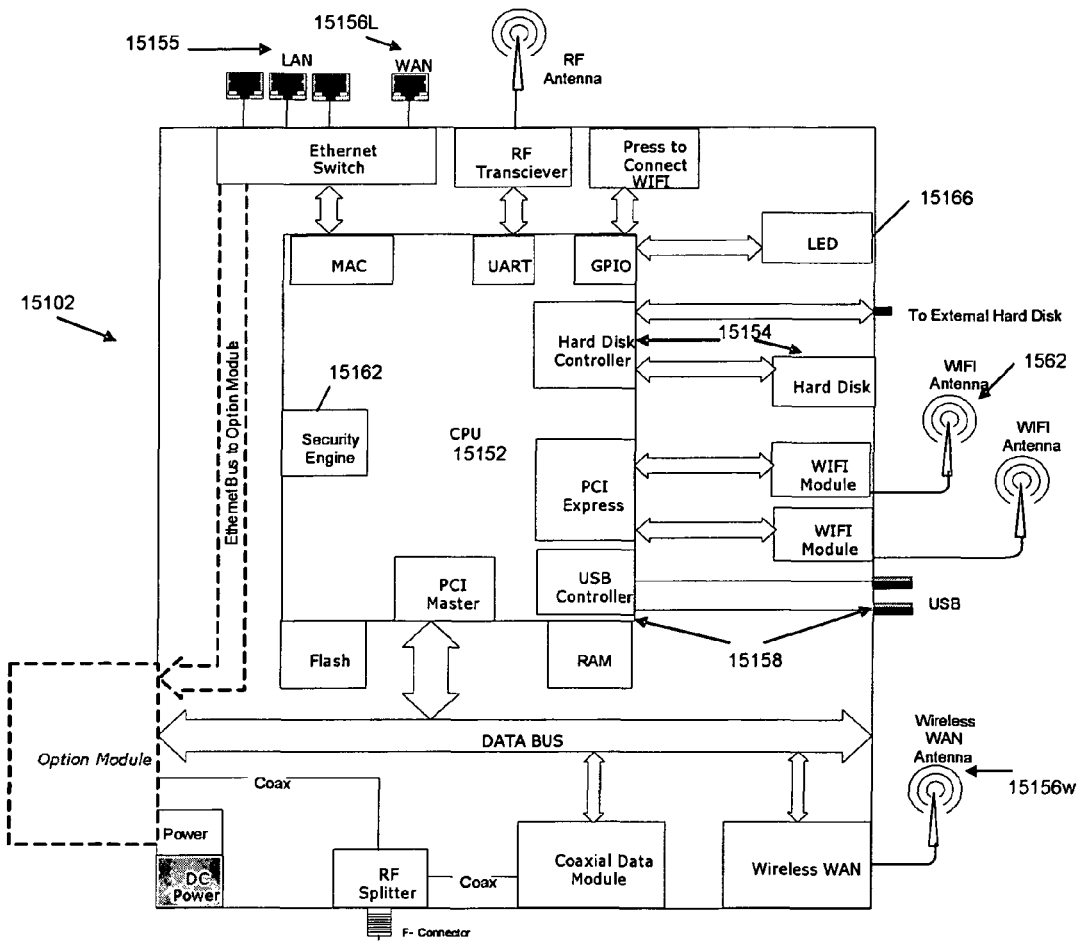

As noted, FIG. 18 provides a functional block diagram of exemplary elements of the hardware layer 15102. For example, a system on a chip provides the CPU 15152 and associated system components. The CPU 15152 is also coupled to a random access memory ("RAM") and flash memory. The system on a chip also includes a hard drive controller for controlling a hard disk drive, and together the controller and drive form the hard disk example of the storage 15154. An Ethernet switch and associated LAN port(s) provide the Ethernet LAN interface 15155; and the Ethernet switch and associated WAN port provide a landline implementation of the WAN interface 15156L, for connection to a broadband modem or the like implementing the NSP-TA. The WAN interface may also be wireless, as implemented at 15156w for example by a wireless WAN module and associated antenna. An example of such an interface would be the EvDO interface discussed earlier. If the gateway device uses the wireless WAN interface 15156w, there would be no separate NSP-TA.

In the example of FIG. 18, a USB controller in the system on a chip and one or more associated USB ports provide the USB interface 15158. The USB interface 15158 may provide an alternate in-premises data communication link instead of or in addition to the wired or wireless Ethernet LAN communications. The system on a chip includes a security engine, which performs the functions of the data encryption/decryption unit 15162.

The hardware layer 15102 may also include an option module. The UNA-DA hardware components at layer 15102 have multiple interfaces for connection to such an option module. These interfaces, by way of example, could be a data bus (e.g. PCI, etc), network interface (e.g. Ethernet (RJ45), MoCA/HPNA (Coax)) and Power feeds. The option module allows additional functionality to be added to the base UNA-DA functionality of the gateway device. For example, this additional functionality could be everything from support for a variety of extra Wide Area Network Interfaces (e.g. xDSL, DOCSIS, Fiber (PON), Cellular Packet, WIMAX, etc.), Media Processing (e.g. Cable TV termination, Digital Video Recording, Satellite TV Termination, etc), to Voice Processing (FXS, FXO, Speech Detection, Voice to Text, etc). The option module may have its own standalone CPU, Memory, I/O, Storage, or provide additional functionality by its use of the CPU, Memory, I/O, and storage facilities off of the main hardware board. The option module may or may not be managed directly by the Platform Management of the UNA-DA.

Those skilled in the art will recognize that functions of the service management center, which reside in the Application Service Management node on the Service Provider Network, as depicted in FIG. 2, may be implemented in a variety of different ways, on one or more computer hardware platforms connected to 1510 gateway devices via a wide area network.

The described approach allows an ANG such as ANG 112 to have rapid session routing capabilities by pre-loading known session endpoint devices into a local routing table. This eliminates the need for any lookups to external tables for specific endpoint devices that are known to be able to terminate certain sessions from the ANG 112, thereby eliminating post session initiation delays.

The ANG such as ANG 112 and its interactions with various endpoint devices and with the MSC 172 have been described with reference to diagrams of methods, apparatus (systems) and computer program products. It will be understood that elements and functions illustrated in the diagrams, can be implemented by computer program instructions running on one or more appropriately configured hardware platforms, e.g. to operate as a ANG or as one or more systems implementing functions of the MSC 172. Hence, operations described above may be carried out by execution of software, firmware, or microcode operating on a computer other programmable device of any type. Additionally, code for implementing such operations may comprise computer instruction in any form (e.g. source code, object code, interpreted code, etc.) stored in or carried by any computer or machine readable medium.

Program aspects of the technology may be thought of a "products," typically in the form of executable code and/or associated data for implementing desired functionality, which is carried on or embodied in a type of machine readable medium. In this way, computer program instructions may be provided to a processor of a general purpose computer, special purpose computer, embedded processor or other programmable data processing apparatus to produce a machine, such that the instructions, which execute via the processor of the computer or other programmable data processing apparatus, so as to implement functions described above.

Terms regarding computer or machine "readable medium" (or media) as used herein therefore relate to any storage medium and any physical or carrier wave transmission medium, which participates in providing instructions or code or data to a processor for execution or processing. Storage media include any or all of the memory of the gateway device or associated modules thereof or any of the hardware platforms as may be used in the service management center, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer into another computer, for example, from an updater or from another element of the MSC 172 into a hardware platform for an ANG. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. Hence, the broad class of media that may bear the instructions or data encompass many forms, including but not limited to, non-volatile storage media, volatile storage media as well as carrier wave and physical forms of transmission media.

Those skilled in the art will recognize that the teachings of this disclosure may be modified, extended and/or applied in a variety of ways. An extension of the system architecture, for example, provides the ability of various and disparate third-party application service providers to provide multiple application services independently. Application services are managed by the "managed" service provider through the service MSC 172, meaning, generally, authorizing, provisioning, and monitoring the usage of a particular application service. This can be accomplished in a variety of ways with varying degrees of involvement of, or coordination with, the service management center. The MSC 172 could manage these items "soup-to-nuts" or have minimal involvement. For example, the MSC 172 could deal directly with the third-party service provider to acquire application services at the request of a user and manage the delivery, authorization, usage-monitoring and upgrading of the application service. At the other end of the spectrum, the managed service provider may have arrangements with the third-party application service provider by which orders or requests from the users may come directly to the third-party application service provider, and services are delivered to the user by the third-party service provider who in turn coordinates with the managed service provider to register and monitor the particular application service placed in the ANG. It should be noted that this ability to manage application services extends through the ANG into the endpoint devices registered or associated with the gateway or network.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A product comprising a machine-readable device that implements a method in a user premises gateway device for rapidly routing a media session for an application layer service over a wide area network while avoiding a public switched telephone network (PSTN) and associated equipment between a first endpoint device located externally from a first user premises gateway device and the first user premises gateway device located at a first user premises, wherein the first user premises comprises at least one of a user home, apartment or office, said first user premises gateway for serving one or more endpoint devices associated with and also located in the first user premises with the first user premises gateway device, the first user premises gateway device having a first interface for enabling bi-directional network layer communications within the first user premises with the one or more endpoint devices and a second interface for enabling bi-directional communications for the one or more endpoint devices located externally from the first user premises and associated with a second user premises gateway also located externally from the first user premises via a wide area network and for enabling at least some bi-directional communications for the first user premises gateway device with a service management center external to the first user premises via the wide area network, the method comprising:

creating through the second interface an always on and out of band first secure control channel between the first user premises gateway and the service management center, the first secure control channel being created independent of a request received at the first user premises gateway from the one or more end point devices associated with the first user premises;

sending and receiving first management updates between the first user premises gateway and the service management center using the first secure control channel, the first management updates including network layer addresses for the one or more endpoint devices associated with the first user premises gateway and services notifications about application layer services available from other user premises gateways associated with at least one of the one or more end point devices including the second user premises gateway;

creating through at least one of the first and second interfaces an out of band second secure control channel between the first user premises gateway and the second user premises gateway, the second secure control channel being created independent of a request received at the first user premises gateway and the second user premises gateway from the one or more end point devices;

sending and receiving second management updates between the first user premises gateway and the second user premises gateway, the second management updates including network layer addresses for the one or more endpoint devices and service notifications about application layer services available from the user first premises gateway and the second user premises gateway;

receiving, at the user first premises gateway device, a request via the local area network directly from a first endpoint device to create the media session over a wide area network with a second device associated with the second user premises gateway, said request including an application layer identifier for the first and second gateway devices;

accessing a routing table within the first user premises gateway device using the application layer identifier and obtaining, from the routing table within the first user premises gateway device, a network layer address for communication over the wide area network via the second user premises gateway with the second device; and
creating a route for the media session between the endpoint devices via bi-directional network layer communications over the wide area network through at least one of the interfaces using the network layer address.

2. A method for setting up a bi-directional communication session over a wide are network (WAN), comprising:
avoiding a public switched telephone network (PSTN) and associated equipment and rapidly routing a media session over a wide area network for an application layer service between a first endpoint device communicating over a local area network with a first user premises gateway located at a user premises, wherein the user premises is a home, apartment or office, and a second endpoint device communicated over a local area network with a second user premises gateway device located at a second user premises and serving one or more endpoint devices also located at the second user premises, the first and second user premises gateway devices each having a first interface for enabling bi-directional network layer communications within the user premises with one or more endpoint devices associated with the user premises gateway devices and a second interface for enabling bi-directional communications for the one or more endpoint devices with remote endpoint devices including via a wide area network and also for enabling at least some bi-directional communications with a service management center external to the user premises via the WAN, the method further comprising:
creating through the second interface an always on and out of band secure control channel between the first user premises gateway and the service management center, the secure control channel being created independent of a request received at the first user premises gateway from the one or more end point devices associated with and in LAN communication with the first user premises gateway;
sending and receiving first management updates between the first user premises gateway and the service management center using the secure control channel, the management updates including network layer addresses for one or more endpoint deices associated with another user premises gateway and services notifications about application layer services available from the another user premises gateway associated with the one of the one or more end point devices;
transmitting a configuration setup request from the first user premises gateway device to the service management center;
receiving information from a routing table in response to the transmission of the configuration setup request through the secure control channel;
receiving a request directly over the WAN without PSTN access from the first endpoint device to create the media session with the second device;
determining whether a route entry related to the second device exists in a routing table associated with the first user premises gateway; and
creating a route for the media session for the application layer service via bi-directional network layer communications over the WAN through at least one of the interfaces using the route entry upon determining that the route entry exists and can be obtained from the routing table.

3. The method of claim 2, further comprising
updating the routing table periodically from the management updates sent by the service management center.

4. The method of claim 3, wherein the routing table comprises an interact protocol address for each endpoint for which a call may be terminated.

5. The method of claim 2, wherein the media session is a voice call session.

6. The method of claim 2, wherein the routing table comprises an address for a session redirect server.

7. The method of claim 2, wherein the routing table comprises an address for a termination device coupling the wide area network with a diverse network.

8. The method of claim 2, wherein the routing table comprises an address for a session border controller.

9. The method of claim 2, wherein the first endpoint device communicates with the processor through the second interface.

10. A product comprising a machine-readable device and programming embodied in the device that, when executed by a processor in the gateway device, implements the method of claim 2.

11. A method for avoiding a PSTN and associated network service provider equipment and rapidly routing a media session over a wide area network (WAN) for an application layer service between a caller using a first endpoint devices associated over a local area network (LAN) with a first user premises gateway located at a caller premises, wherein the caller premises comprises at least one of a home, apartment unit or office, and a callee using a second endpoint device associated over a LAN with a second user premises gateway located at a cake premises, wherein the callee premises comprises at least one of a home, apartment unit or office, and wherein the first and second user premises gateway devices located at their respective user premises each serve one or more endpoint devices also located at the respective user premises for each user premises gateway device, the user premises gateway devices each having a first interface for enabling bi-directional network layer communications within their respective user premises with the one or more endpoint devices and a second interface for enabling bi-directional communications for the one or more endpoint devices via a wide area network and for enabling at least some bi-directional communications for each of the user premises gateway devices and a service management center external to each the premises via the wide area network, the method comprising:
accessing a routing table within the first user premises gateway device using the application layer identifier and obtaining, from the routing table within the first user premises gateway device, a network layer address for communication with a second endpoint device associated with a second the user premises gateway device located at a second user premises;
creating a route for the media session for the application layer service via bi-directional network layer communications through at least one of the interfaces using the network layer address;
avoiding the PSTN and associated network service provider equipment for rapidly routing the media session over a wide area network for an application layer service between the first endpoint device associated with the first user premise gateway device and the second endpoint device associated with the second user premises gateway device located at the second user premises, wherein said second user premises gateway serves one or more endpoint devices also located at the second user premises, the second user premises gateway device includes a first interface for enabling bi-directional network layer communications within the second user premises with the one or more endpoint devices associated with the second user premises gateway device and includes a second interface for enabling bi-directional communications for the one or more endpoint devices with other remote endpoint devices and user premises gateways including the first endpoint device via a wide area network;

receiving, at the second user premises gateway device, a request via the wide area network directly from the first user premise gateway device to create the media session with the second endpoint device associated over a local area network with the second user premises gateway, said request including application layer identifiers for the first second gateway devices;

accessing a routing table within the second user premises gateway device using the application layer identifier and obtaining, from the routing table within the second user premises gateway device, a network layer address for communication with the second endpoint device; and creating a route for the media session for the application layer service via bi-directional network layer communications through at least one of the interfaces using the network layer address.

12. The method of claim 11, wherein said second interface further enables at least some bi-directional communications with a service management center external to the user premises via the wide area network, the method further comprising;

creating through the second interface an always on and out of band secure control channel between the user premises gateways and the service management center, the secure control channel being created independent of a request received at the user premises gateways from remote end point devices;

sending and receiving management updates between the user premises gateways and the service management center using the secure control channel, the management updates including network layer addresses for the one or more endpoint devices and service notifications about application layer services available from another user premises gateway associated with at least one of the one or more end point devices;

transmitting a configuration setup request from the gateway device to the service management center; and receiving the routing table in response to the transmission of the configuration setup request.

13. The method of claim 11, further comprising updating the routing table periodically from the management updates sent by the service management center.

14. The method of claim 11, wherein the media session is a voice call session.

15. The method of claim 11, wherein the routing table comprises an internet protocol address for each endpoint for which a session can be terminated.

16. The method of claim 11, wherein the routing table comprises an address for a session redirect server.

17. The method of claim 11, wherein the routing table comprises an address for a termination device coupling the wide area network with a diverse network.

18. The method of claim 11, wherein the routing table comprises an address for a session border controller.

19. The method of claim 11, wherein the first endpoint device communicates with a processor through the second interface.

* * * * *